(12) United States Patent
Hong

(10) Patent No.: US 8,472,744 B2
(45) Date of Patent: Jun. 25, 2013

(54) DEVICE AND METHOD FOR ESTIMATING WHETHER AN IMAGE IS BLURRED

(75) Inventor: Li Hong, San Diego, CA (US)

(73) Assignee: Nikon Corporation, Tokyo (JP)

( * ) Notice: Subject to any disclaimer, the term of this patent is extended or adjusted under 35 U.S.C. 154(b) by 411 days.

(21) Appl. No.: 12/810,486

(22) PCT Filed: May 26, 2009

(86) PCT No.: PCT/US2009/045128
§ 371 (c)(1),
(2), (4) Date: Jun. 24, 2010

(87) PCT Pub. No.: WO2009/146297
PCT Pub. Date: Dec. 3, 2009

(65) Prior Publication Data
US 2010/0272356 A1 Oct. 28, 2010

Related U.S. Application Data

(60) Provisional application No. 61/056,231, filed on May 27, 2008.

(51) Int. Cl.
*G06K 9/00* (2006.01)
*G06T 5/00* (2006.01)
*H04N 5/232* (2006.01)

(52) U.S. Cl.
CPC ............ *G06T 5/001* (2013.01); *H04N 5/23212* (2013.01)
USPC ........................................................ 382/255

(58) Field of Classification Search
CPC ........................................................ G06T 5/001
USPC ......... 382/165, 168, 255, 260, 264; 348/345, 348/349, 350, 356, 369; 396/89, 125
See application file for complete search history.

(56) References Cited

U.S. PATENT DOCUMENTS

| 5,040,228 | A | | 8/1991 | Bose et al. | |
|---|---|---|---|---|---|
| 6,075,905 | A | * | 6/2000 | Herman et al. | 382/284 |
| 6,124,890 | A | * | 9/2000 | Muramoto | 348/345 |
| 8,218,868 | B2 | * | 7/2012 | Stern et al. | 382/168 |
| 2003/0185420 | A1 | * | 10/2003 | Sefcik et al. | 382/103 |
| 2003/0202714 | A1 | * | 10/2003 | Yang et al. | 382/274 |
| 2004/0008901 | A1 | * | 1/2004 | Avinash | 382/260 |

(Continued)

OTHER PUBLICATIONS

Fergus et al (Removing Camera Shake from a Single Photograph), 1 MIT CSAIL2, University of Toronto, 2006.*
PCT Search Report and Written Opinion for PCT/US09/45128 (related to the present application) mailed Oct. 29, 2009, Nikon Corporation.
International Preliminary Report on Patentability for PCT/US09/45128 (related to the present application) mailed Dec. 27, 2010, Nikon Corporation.
Y. Yitzhaky and N.S. Kopeika, Identification of Blur Parameters from Motion Blurred Images, revised Apr. 30, 2009, accepted May 8, 1997, Dept. of Electrical and Computer Engineering, Ben-Gurion University of the Negev, 84105 Israel, Copyright 1997 Academic Press.

*Primary Examiner* — Claire X Wang
*Assistant Examiner* — Shervin Nakhjavan
(74) *Attorney, Agent, or Firm* — Roeder & Broder LLP

(57) ABSTRACT

A method for estimating whether an image (14) is either blurred or sharp includes the steps of (i) determining an image gradient histogram distrbution (410) of at least a portion of the image (14), (ii) comparing at least a portion of the image gradient histogram distribution (410) to a Gaussian model (414), and (iii) estimating a defocus blur size of at least a portion of the image (14) Additional methods for evaluating whether the image (14) has motion blur are provided herein For example, a dominant gradient orientation can be detected by histogram analysis (716), and the dominant gradient orientation (718) can be used to determine a possible motion blur direction (720) Alternatively, a dominant gradient orientation can be detected using principal component analysis ("PCA") on the image.

29 Claims, 16 Drawing Sheets

U.S. PATENT DOCUMENTS

| | | |
|---|---|---|
| 2005/0052559 A1* | 3/2005 | Hayaishi .................. 348/335 |
| 2005/0231603 A1 | 10/2005 | Poon |
| 2005/0244075 A1 | 11/2005 | Shaked et al. |
| 2005/0249429 A1* | 11/2005 | Kitamura .................. 382/255 |
| 2006/0093234 A1 | 5/2006 | Silverstein |
| 2006/0153471 A1 | 7/2006 | Lim et al. |
| 2006/0204120 A1 | 9/2006 | Poon et al. |
| 2006/0269141 A1 | 11/2006 | Takahashi |
| 2007/0290886 A1 | 12/2007 | Stam et al. |
| 2008/0025627 A1* | 1/2008 | Freeman et al. .............. 382/255 |
| 2008/0175508 A1* | 7/2008 | Bando et al. ................. 382/255 |
| 2008/0253622 A1* | 10/2008 | Tosa et al. .................... 382/117 |

* cited by examiner

DEVICE AND METHOD FOR ESTIMATING WHETHER AN IMAGE IS BLURRED

BACKGROUND

Cameras are commonly used to capture an image of a scene that includes one or more objects. Unfortunately, some of the images are blurred. For example, movement of the camera and/or movement of the objects in the scene during the exposure time of the camera can cause the image to be blurred. Further, if the camera is not properly focused when the image is captured, that image will be blurred.

Currently, there are some methods that are used to determine whether the image is blurred. Unfortunately, many of these methods associate blur degree with edge spreading in the image. As a result thereof, their performance is very sensitive to the accuracy of edge detection techniques. For a sharp and low noise image, the current edge detection techniques can achieve good results. However, this performance degrades drastically for noisy images.

SUMMARY

The present invention is directed to a method for estimating whether an image is either blurred or sharp. In one embodiment, the method includes the steps of (i) determining an image gradient histogram distribution of at least a portion of the image, (ii) comparing at least a portion of the image gradient histogram distribution to a Gaussian model, and (iii) estimating a defocus blur size of at least a portion of the image. As an overview, in most cases, a sharp image has a relatively high number of large gradients when compared to the Gaussian model, while a blurred image has a relatively small number of large gradients when compared to the Gaussian model. Further, a sharp image will have a relatively small defocus blur size. Thus, the present invention uses two unique procedures for estimating if one or more of the captured images are blurred. This results in superior performance for image sharpness classification.

In one embodiment, if either of the two procedures indicates that the image is sharp, the image is classified as sharp. In an alternative embodiment, both of the procedures must indicate that the image is sharp before the image is classified as sharp.

In one embodiment, the image is divided into a plurality of image regions and an image gradient histogram distribution of at least one of the image regions is determined. Further, in this embodiment, the image gradient histogram distributions for at least one of the image regions is compared to a Gaussian model for that image region to estimate if the image is either blurred or sharp and/or to assign a blur metric value to that image region.

In certain embodiments, a tail section of the Gaussian model is compared to a tail section of the image gradient histogram distribution to estimate if the image is either blurred or sharp.

Additionally, the present method can include the step of evaluating the image to estimate if there is motion blur in the image. For example, a dominant gradient orientation can be detected by histogram analysis, and the dominant gradient orientation can be used to determine a possible motion blur direction. Alternatively, for example, a dominant gradient orientation can be detected using principal component analysis ("PCA") on the image gradient. In this example, reliable gradient vectors are determined from the image. Subsequently, first and second PCA components are computed, and a dominant gradient orientation can be detected via the first component orientation if the ratio of the first and second PCA components variances exceeds certain threshold.

Further, the method can include the step of evaluating at least a portion of the image to determine if the contrast is correct. For example, an intensity domain histogram curve of the image can be generated to determine if the contrast of the image is correct. Moreover, the contrast can be adjusted (e.g. by linear mapping to a higher contrast) for at least a portion of the image if the contrast is determined to be below the predetermined threshold.

In yet another embodiment, the method includes the steps of: (i) blurring the image to create an artificially blurred image; (ii) determining an image gradient histogram distribution for at least a portion of the image; (iii) determining an image gradient histogram distribution for at least a portion of the artificially blurred image; and (iv) comparing at least a portion of the image gradient histogram distribution of the image to at least a portion of the image gradient histogram distribution for the artificially blurred image to compute a distribution probability difference to estimate if the image is either blurred or sharp.

In one embodiment, the step of estimating the defocus blur size includes the steps of removing at least a portion of any content correlation from the input image to generate a decorrelated image, and computing an autocorrelation matrix from the decorrelated image. Subsequently, the method can include the steps of rotating the autocorrelation matrix to a plurality of alternative angles to generate a plurality of rotated matrixes, and averaging the plurality of rotated matrixes to calculate an averaged autocorrelation matrix. Next, the defocus blur kernel size can be accurately estimated from the averaged autocorrelation matrix.

In certain embodiments, the defocus blur size is calculated for only certain, selected image regions. For example, the defocus blur size can be calculated for (i) image regions with texture (avoid too smooth image regions), (ii) image regions with blur metric value higher than a certain threshold (avoid too blurry image regions), (iii) image regions related to a region of interest to the user, or (iv) image regions used for auto-focus purposes of the camera. By computing the defocus blur size in a selective way, the amount of computation is reduced while the blur estimation accuracy is still improved.

As used herein, the term "content correlation" shall mean correlation among pixels due to image scene structures, e.g., pixels belong to the same object tend to have stronger correlation than pixels from different object.

In one embodiment, the step of removing the content correlation includes the step of applying a decorrelation filter to the input image. More specifically, this step can include applying a Laplace type filter to the input image.

Additionally, the input image can be deblurred or deconvolved using the defocus blur size to provide an adjusted image.

Moreover, in certain embodiments, the present method can include the step of removing noise from the input image prior to the step of removing any content correlation and/or computing an autocorrelation matrix.

In still another embodiment, the present invention is directed to a device for estimating if an image is either blurred or sharp. The device can include a control system that (i) determines an image gradient histogram distribution of at least a portion of the image; (ii) compares at least a portion of the image gradient histogram distribution to a Gaussian model; and (iii) estimates a defocus blur size in the image. In this embodiment, a control system can perform some or all of the steps described herein.

In yet another embodiment, the present invention is directed to a method and device for reducing blur in an image.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
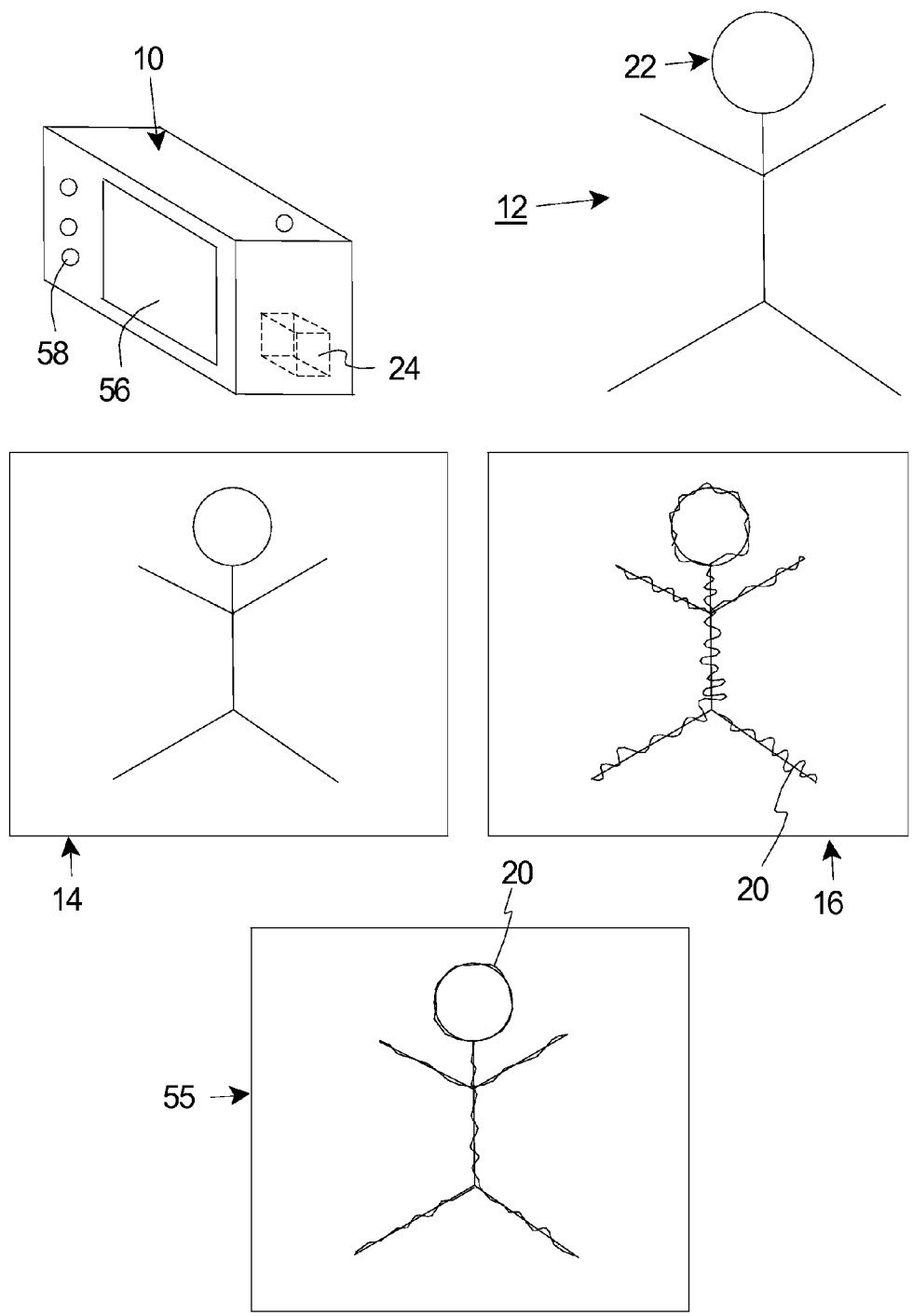
FIG. 1 is a simplified view of a scene, an image apparatus having features of the present invention, a raw, first captured image of the scene, a raw, second captured image of the scene, and an adjusted image.

FIG. 1 is a simplified perspective illustration of an image apparatus 10 having features of the present invention, and a scene 12. FIG. 1 also illustrates a raw first captured image 14 (illustrated away from the image apparatus 10), and a raw second captured image 16 (illustrated away from the image apparatus 10) captured by the image apparatus 10. In FIG. 1, the first captured image 14 is a sharp image and the second captured image 16 is blurred 20 (illustrated as a wavy line). For example, movement of the image apparatus 10, and/or movement of an object 22 in the scene 12 during the capturing of the blurred image 16 can cause motion blur 20 in the image 14. Alternatively or additionally, blur 20 in the image 16 can be caused by the image apparatus 10 not being properly focused when the image 14 is captured.

In one embodiment, the image apparatus 10 includes a control system 24 (illustrated in phantom) that uses two unique procedures (methods) for estimating if one or more of the captured images 14, 16 are blurred. For example, the first method used to evaluate the images 14, 16 relies on the concept that sharp natural images have a heavy tailed gradient distribution, and the second method used to evaluate the images 14, 16 relies on the concept that an autocorrelation matrix ("ACM") can be rotated and averaged to estimate a defocus blur size. As a result of using two methods to evaluate each image 14, 16, the present invention provides a device and method for determining whether a particular image 14, 16 is blurred or sharp with improved accuracy. Subsequently, a deblurring process can be applied to only the images 16 that are determined to be blurred. Thus, a sharp image 14 will not be subjected to the deblurring process.

In one embodiment, if either of the two methods indicates that the image is sharp, the image is classified as sharp. In an alternative embodiment, both of the methods must indicate that the image is sharp before the image is classified as sharp.

As a further overview, in certain embodiments, the image 14, 16 is divided into a plurality of image regions (not shown in FIG. 1) and one or more of the image regions are subjected to the two methods to determine if that particular image region is blurred. In one embodiment, the image is classified as sharp if one or more of the image regions is indicated to be sharp by at least one of the methods. In another embodiment, the image is classified as sharp if one or more of the image regions is indicated to be sharp by both methods. In yet another embodiment, the image is classified as sharp only if a plurality of the image regions is indicated to be sharp by at least one of the methods.

The type of scene 12 captured by the image apparatus 10 can vary. For example, the scene 12 can include one or more objects 22, e.g. animals, plants, mammals, and/or environments. For simplicity, in FIG. 1, the scene 12 is illustrated as including one object 22. Alternatively, the scene 12 can include more than one object 22. In FIG. 1, the object 22 is a simplified stick figure of a person.

Figure 2:
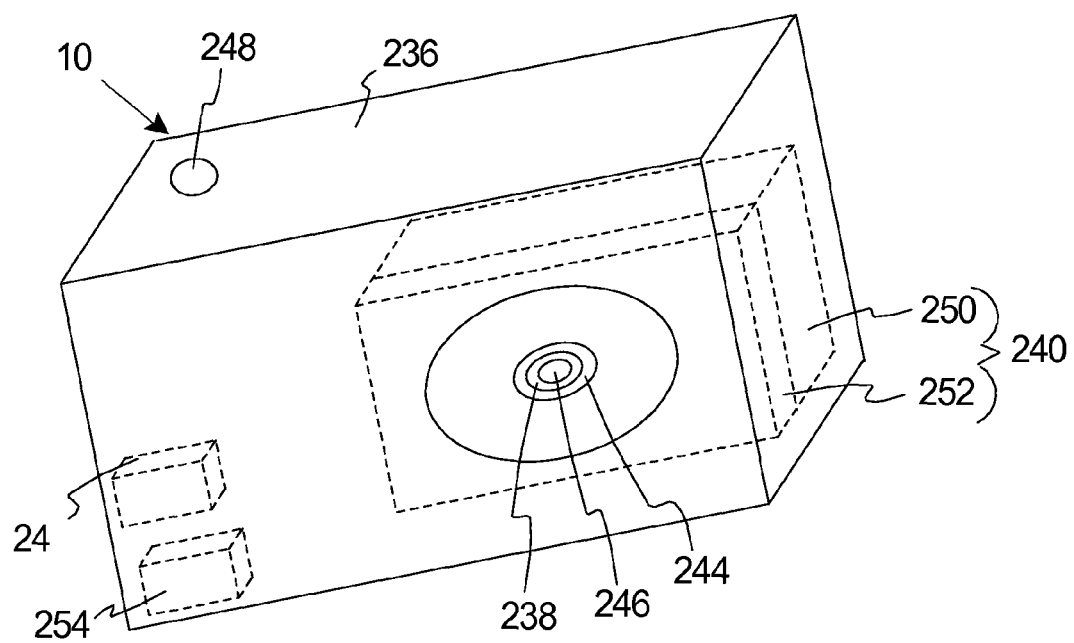
FIG. 2 is a simplified front perspective view of the image apparatus of FIG. 1.

FIG. 2 illustrates a simplified, front perspective view of one, non-exclusive embodiment of the image apparatus 10. In this embodiment, the image apparatus 10 is a digital camera, and includes an apparatus frame 236, an optical assembly 238, and a capturing system 240 (illustrated as a box in phantom), in addition to the control system 24 (illustrated as a box in phantom). The design of these components can be varied to suit the design requirements and type of image apparatus 10. Further, the image apparatus 10 could be designed without one or more of these components. Additionally or alternatively, the image apparatus 10 can be designed to capture a video of the scene 12.

The apparatus frame 236 can be rigid and support at least some of the other components of the image apparatus 10. In one embodiment, the apparatus frame 236 includes a generally rectangular shaped hollow body that forms a cavity that receives and retains at least some of the other components of the camera.

The apparatus frame 236 can include an aperture 244 and a shutter mechanism 246 that work together to control the amount of light that reaches the capturing system 240. The shutter mechanism 246 can be activated by a shutter button 248. The shutter mechanism 246 can include a pair of blinds (sometimes referred to as "blades") that work in conjunction with each other to allow the light to be focused on the capturing system 240 for a certain amount of time. Alternatively, for example, the shutter mechanism 246 can be all electronic and contain no moving parts. For example, an electronic capturing system 240 can have a capture time controlled electronically to emulate the functionality of the blinds.

The optical assembly 238 can include a single lens or a combination of lenses that work in conjunction with each other to focus light onto the capturing system 240. In one embodiment, the image apparatus 10 includes an autofocus assembly (not shown) including one or more lens movers that move one or more lenses of the optical assembly 238 in or out until the sharpest possible image of the subject is received by the capturing system 240.

The capturing system 240 captures information for the images 14, 16 (illustrated in FIG. 1). The design of the capturing system 240 can vary according to the type of image apparatus 10. For a digital type camera, the capturing system 240 includes an image sensor 250 (illustrated in phantom), a filter assembly 252 (illustrated in phantom), and a storage system 254 (illustrated in phantom).

The image sensor 250 receives the light that passes through the aperture 244 and converts the light into electricity. One non-exclusive example of an image sensor 250 for digital cameras is known as a charge coupled device ("CCD"). An alternative image sensor 250 that may be employed in digital cameras uses complementary metal oxide semiconductor ("CMOS") technology.

The image sensor 250, by itself, produces a grayscale image as it only keeps track of the total quantity of the light that strikes the surface of the image sensor 250. Accordingly, in order to produce a full color image, the filter assembly 252 is generally used to capture the colors of the image.

The storage system 254 stores the various images before these images are ultimately printed out, deleted, transferred or downloaded to an auxiliary storage system or a printer. The storage system 254 can be fixedly or removable coupled to the apparatus frame 236. Non-exclusive examples of suitable storage systems 254 include flash memory, a floppy disk, a hard disk, or a writeable CD or DVD.

The control system 24 is electrically connected to and controls the operation of the electrical components of the image apparatus 10. The control system 24 can include one or more processors and circuits, and the control system 24 can be programmed to perform one or more of the functions described herein. In FIG. 2, the control system 24 is secured to the apparatus frame 236 and the rest of the components of the image apparatus 10. Further, in this embodiment, the control system 24 is positioned within the apparatus frame 236.

Referring back to FIG. 1, in certain embodiments, the control system 24 includes software that utilizes two methods to estimate if a given image 14, 16 is sharp or blurred. Further, in certain embodiments, the control system 24 can include software that reduces the amount of blur 20 in a blurred image 16 to provide an adjusted image 55. In this example, the control system 24 determines that the first image 14 is sharp and that no further processing is necessary. Further, the control system 24 determines that the second image 16 is blurred. Subsequently, the control system 24 reduces the blur in the second image 16 to provide the adjusted image 55.

The image apparatus 10 can include an image display 56 that displays the raw images 14, 16 and/or the adjusted image 55. With this design, the user can decide which images 14, 16, 55 should be stored and which images 14, 16, 55 should be deleted. In FIG. 1, the image display 56 is fixedly mounted to the rest of the image apparatus 10. Alternatively, the image display 56 can be secured with a hinge mounting system (not shown) that enables the display 56 to be pivoted. One non-exclusive example of an image display 56 includes an LCD screen.

Further, the image display 56 can display other information that can be used to control the functions of the image apparatus 10.

Moreover, the image apparatus 10 can include one or more control switches 58 electrically connected to the control system 24 that allows the user to control the functions of the image apparatus 10. For example, one or more of the control switches 58 can be used to selectively switch the image apparatus 10 to the blur evaluation and reduction processes disclosed herein. For example, in certain embodiments, in order to save computation, the present invention can be selectively applied (manually or automatically) to a certain type of image, e.g. close up portraits/statutes, macros, etc.

Figure 3:
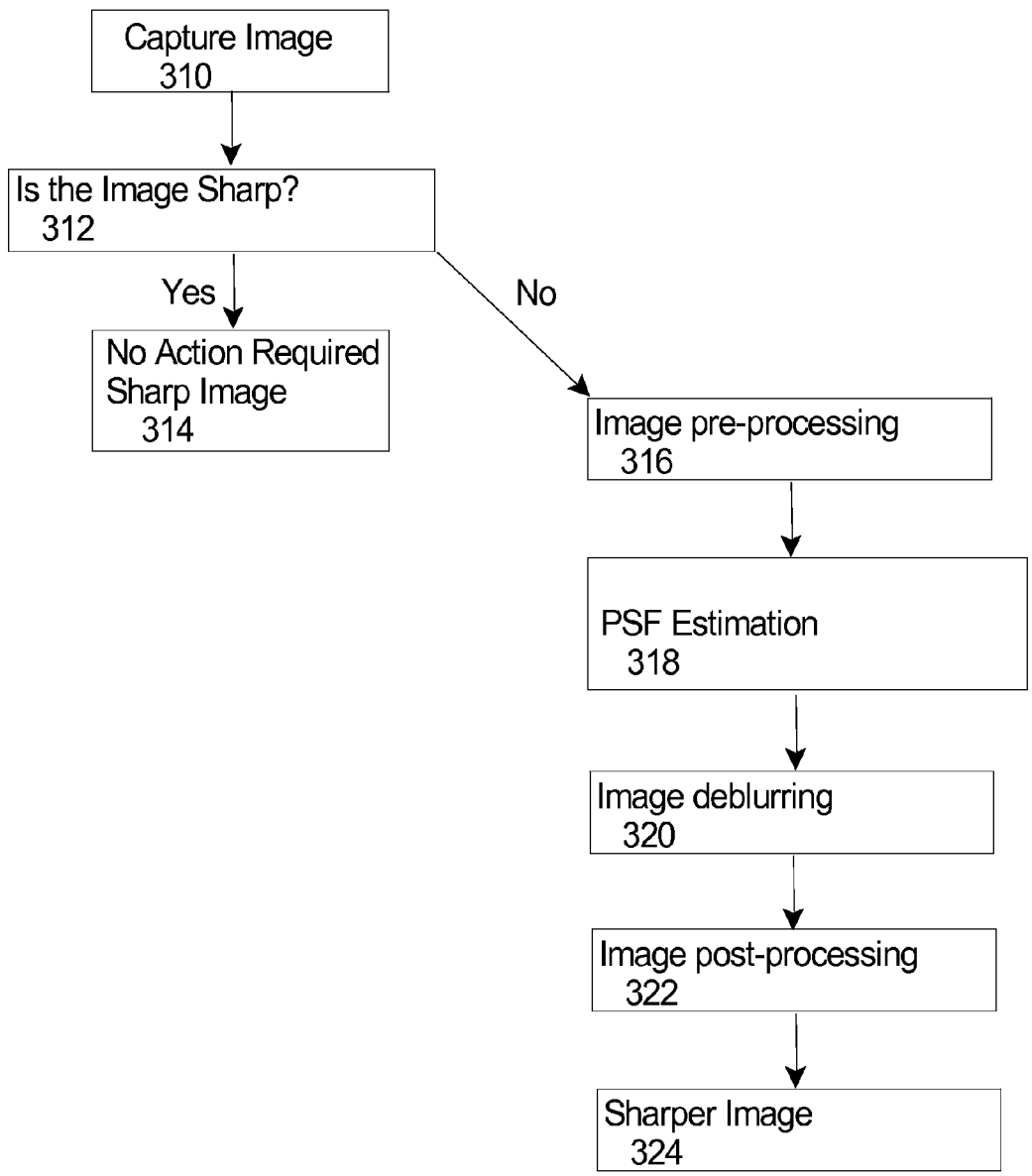
FIG. 3 is a flow chart that illustrates one embodiment of an image processing procedure having features of the present invention.

FIG. 3 is a flow chart that illustrates one embodiment of an image processing procedure having features of the present invention. First, the image is captured at step 310. Next, the image or (one or more image regions) is evaluated using two methods to classify if the image is sharp at step 312. This step is discussed in more detail below. If the image is sharp, processing of that image is complete 314. Alternatively, if the image is determined to be blurred, pre-processing of the image begins at step 316. For example, a Point Spread Function ("PSF") can be estimated for the image at step 318. Subsequently, the image is deblurred using the PSF at step 320. Next, the image is post-processed at step 322. Finally, the adjusted, sharper image is generated at step 324.

The processes used to evaluate an image to classify the image as sharp or blurred can be varied pursuant to the teachings provided herein. As discussed above, the present invention uses two procedures to evaluate at least a portion of the images to improve the accuracy of the estimation of whether the image is blurred or sharp.

As an overview, the first method (blur metric method) used to evaluate the images 14, 16 relies on the concept that sharp natural images have a heavy tailed gradient distribution, and the second method (defocus blur size method) used to evaluate the images 14, 16 relies on the concept that an autocorrelation matrix ("ACM") can be rotated and averaged to estimate a defocus blur kernel size. The first, blur metric method is described in reference to FIGS. 4A-9D, and the second, defocus blur size method is described in reference to FIGS. 10-14B.

Figure 4A:
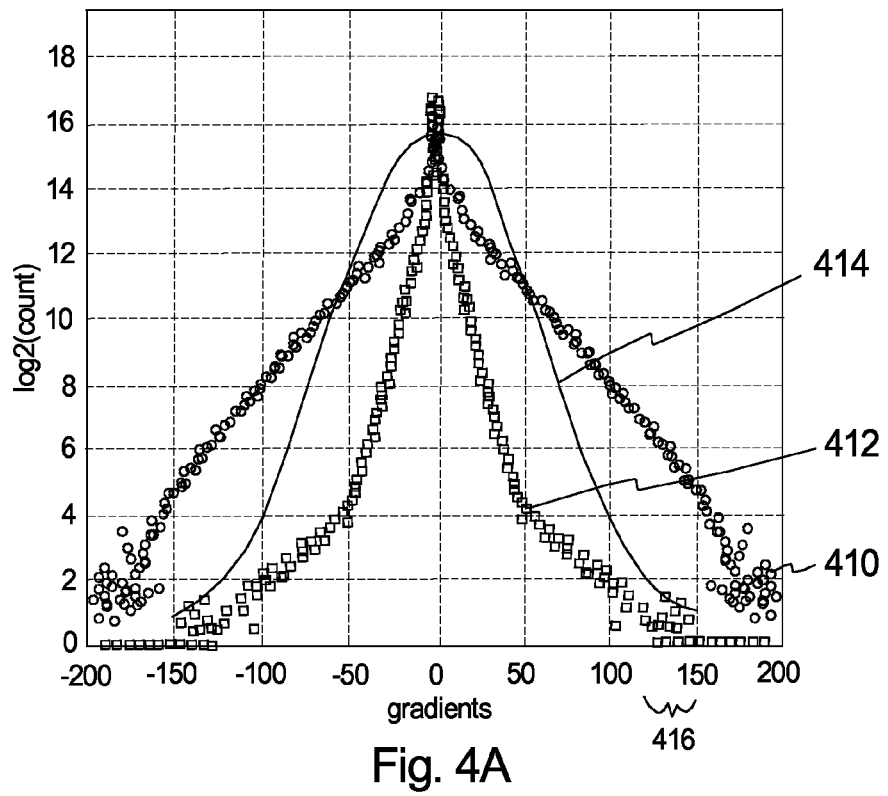
FIG. 4A is a graph that illustrates an image gradient histogram distribution for the first image, an image gradient histogram distribution for the second image, and a Gaussian model.

FIG. 4A is a graph that illustrates a first image gradient histogram distribution 410 (illustrated as a plurality of circles) for the sharp first image 14 (illustrated in FIG. 1), a second image gradient histogram distribution 412 (illustrated as a plurality of squares) for the blurred second image 16 (illustrated in FIG. 1), and distribution 414 for a Gaussian model (illustrated as a line). As illustrated in FIG. 4A, the gradient value can be positive or negative.

Figure 4B:
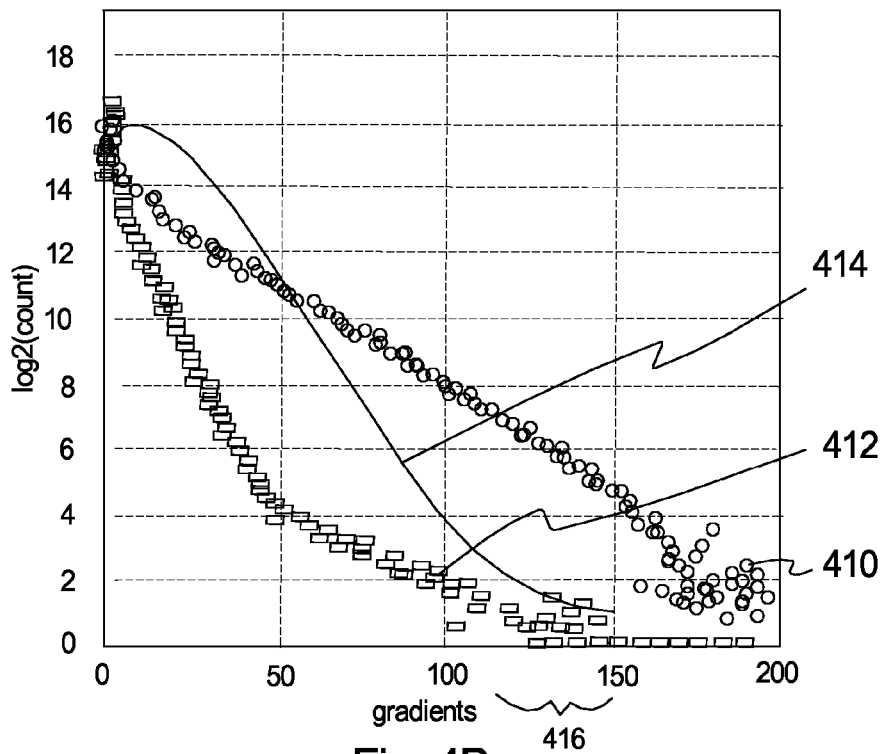
FIG. 4B is a graph that illustrates a histogram distribution of the absolute image gradient for the first image, a histogram distribution of the absolute image gradient for the second image, and an absolute value for a Gaussian model.

Somewhat similarly, FIG. 4B is a graph that illustrates a histogram distribution of the absolute image gradient of the first image gradient histogram distribution 410 (illustrated as a plurality of circles) for the sharp first image 14 (illustrated in FIG. 1), a histogram distribution of the absolute image gradient for the second image gradient histogram distribution 412 (illustrated as a plurality of squares) for the blurred second image 16 (illustrated in FIG. 1), and a Gaussian model 414 (illustrated as a line). To generate FIG. 4B, the histograms of the absolute values of the image gradients are utilized. In certain embodiments, the term image gradient histogram refers to this histogram distribution of the absolute image gradients.

In FIGS. 4A and 4B, the vertical axis represents the count value (e.g. the number of pixels with a specific gradient value), while the horizontal axis represents the gradient value. Thus, the higher the count value vertically represents a higher number of pixels that have that gradient value. In FIG. 4A, the gradient value increases moving left and right from zero, while in FIG. 4B, the gradient value increases moving left to right.

For each image 14, 16 the respective image gradient histogram distribution 410, 412 represents how much difference exists between each pixel and its neighboring pixels in the respective image. The difference can be measured along the X axis, along the Y axis, diagonally, or along some other axis. Further, the difference can be the intensity difference, or possibly some other difference.

For example, for the first image 14, the value for the first image gradient histogram distribution 410 can represent how much difference in intensity exists between adjacent pixels along the X axis. This example can be represented as following equation:

$$Gx = G(i,j) - G(i+1, j)$$

where $G(i,j)$ represents the intensity of a pixel located at i, j; and $G(i+1, j)$ represents the intensity of a pixel located at i+1, j.

Alternatively, for the first image 14, the value for the first image gradient histogram distribution 410 can represent how much difference in intensity exists between adjacent pixels along the Y axis. This example can be represented as following equation:

$$Gy = G(i,j) - G(i, j+1)$$

where $G(i,j)$ represents the intensity of a pixel located at i, j; and $G(i, j+1)$ represents the intensity of a pixel located at i, j+1.

The second image gradient histogram distribution 412 can be calculated in a similar fashion.

It should be noted that the respective image gradient histogram distribution 410, 412 and the Gaussian model 414 can be calculated for the entire respective image 14, 16. Alternatively, the respective image gradient histogram distribution 410, 412 and the Gaussian model 414 can be calculated for one or more selected regions of the respective image 14, 16. This example is discussed in more detail below.

The Gaussian model is an adaptive reference model that is based on the image gradient histogram curve. In one embodiment, the Gaussian model is computed from a standard Gaussian function with variation 2.5 and window size of 150. The scale of the Gaussian model is computed as the ratio of the sum of the image gradient histogram to the sum of the standard Gaussian function. In certain embodiments, the Gaussian model window width is within approximately 120-180 gradients. Typically, the higher the peak distribution value, the smaller the Gaussian window width. Further, the higher the number of large image gradients, the bigger the Gaussian window width.

Stated in another fashion, the reference Gaussian model can be adjusted based on the image gradient characteristics. In general, the Gaussian model window size is approximately 150, with the large gradient cutoff of approximately 100-150. The Gaussian model scale is the ratio from the area of the gradient curve to the area of the Gaussian model. In certain embodiments, the model is adaptively adjusted based on the image gradient histogram characteristics. In one embodiment, the basic adjusting rule includes (i) increasing or decreasing the window size based on the amount of high gradients present in the image, (ii) adjusting the cut-off window size based on the adjusted Gaussian window, and (iii) constraining the Gaussian model scale in certain range (not too low and not too high).

Referring to the image gradient histogram distribution 410, sharp images 14 obey heavy-tailed distribution in their gradient domain (e.g. have a relatively high number of large gradients). The distribution of gradients has a large probability on small gradients (approximately −50 to 50 gradients) and small probability on large gradients (approximately −150 to −200 gradients and 150 to 200 gradients), but it shows significantly more probability to large gradients than the Gaussian distribution 414.

Comparing each image gradient histogram distribution 410, 412 with its respective Gaussian model 414 illustrates that the first image gradient histogram distribution 410 for a sharp image 14 has significantly more probability to large gradients than the Gaussian model 414, while the second gradient histogram distribution 412 for blurry image 16 has significantly less probability for large gradients than the Gaussian model 414. Thus, in certain embodiments, the present invention relies on the determination that a sharp image 14 will have significantly more probability to large gradients than the Gaussian model 414.

Stated in another fashion, sharp images 14 have a heavy-tailed distribution in their image gradient histogram distribution 410. Thus, sharp image gradient histogram distributions 410 show significantly more probability to large gradients than the Gaussian model 414. In this embodiment, the present invention defines the estimating measure as the difference of large gradients distribution probability between a given image and the Gaussian model. With the present invention, the estimating measure will show larger positive value for a focused image and a relatively small positive or a negative value for defocused image.

As provided herein, the present invention can focus on a tail section 416 of the gradient distributions to determine if an image is in focus. As used herein the term "tail section" 416 shall refer to the last portion of the Gaussian model 414, e.g. the last 10-20 percent of the Gaussian model 414 in one embodiment. Because the Gaussian model will vary according to the scene, the exact value for the tail section will vary according to the scene that is being captured.

Referring to FIGS. 4A and 4B, in this example, the Gaussian model 414 has a maximum gradient value of approximately 150. In this example, the Gaussian tail section 416 can have a gradient value of greater than approximately 120 and above (e.g. last 20% of Gaussian model).

In this embodiment, reviewing the tail section 416 area in FIGS. 4A and 4B, only the first image gradient histogram distribution 410 has higher counts in the tail section 416 than the Gaussian model 414. Further, the second image gradient histogram distribution 412 has a much fewer gradients than the Gaussian model in the tail section 416. Thus, only the first image 14 is in focus, while the second image 16 is not in focus.

It should be noted that the present method can assign a blur metric value to each image based on the difference between the respective image gradient histogram distribution 410, 412 and the Gaussian model 414. The term blur metric is also sometimes referred to herein as blur degree. In certain embodiments, only the count differences in the tail section 416 are considered when assigning the blur metric value. Alternatively, the count differences outside the tail section 416 can also be considered when calculating the blur metric.

In one non-exclusive embodiment, the blur metric can be equal to the normalized sum of the differences in the gradient histogram distributions. It can be normalized via the sum of the tail section of the reference Gaussian model.

In one embodiment, if the value of the blur metric for an image or a portion thereof is above a predetermined threshold blur value, that image is classified as a sharp image. Alternatively, if the value of the blur metric for an image or a portion thereof is below the predetermined threshold blur value, that image is classified as a blurred image. As non exclusive examples, the predetermined threshold blur value can be 0.9, 0.8, or 0.7.

Figure 5A:
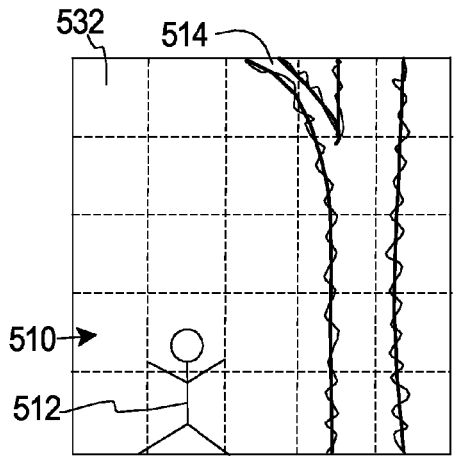
FIG. 5A is a simplified illustration of another captured image.
Figure 5B:
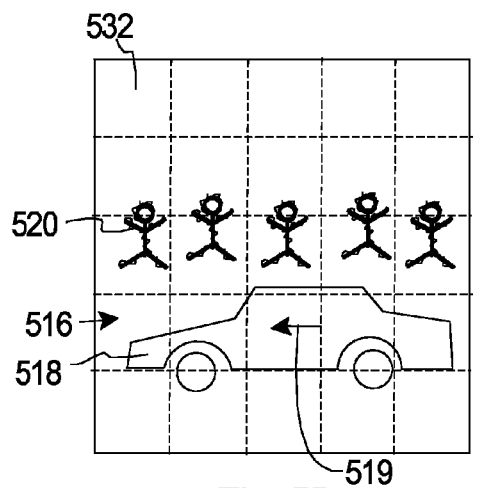
FIG. 5B is a simplified illustration of yet another captured image.

FIGS. 5A and 5B are simplified illustrations of alternative captured images that can be analyzed utilizing the processes disclosed herein. More specifically, FIG. 5A is a simplified image 510 of a person 512 (illustrated as a stick figure) and a portion of a tree 514. In this embodiment, the person 512 is in focus, while the tree 514 (illustrated with wavy lines to depict blur) is in the background and is not in focus. Further, FIG. 5B is a simplified image 516 of a moving car 518 (as indicated by arrow labeled 519) with a plurality of stationary people 520 (illustrated as stick figures) behind the car 518. In the FIG. 5B embodiment, the image apparatus (not shown) was moved in the same direction as the car 518 while capturing this image 516 so that the moving car 518 is in focus while the stationary people 520 (illustrated with wavy lines to depict blur) are blurred.

In these examples, the desired features of the images 510, 516 are properly focused. More specifically, the person 512 in image 510 is in focus and the car 518 in image 516 is in focus. Unfortunately, in some instances, if the respective image gradient histogram distribution and the Gaussian model are calculated and compared for the entire image, these images can be determined to be blurred.

Figure 5C:
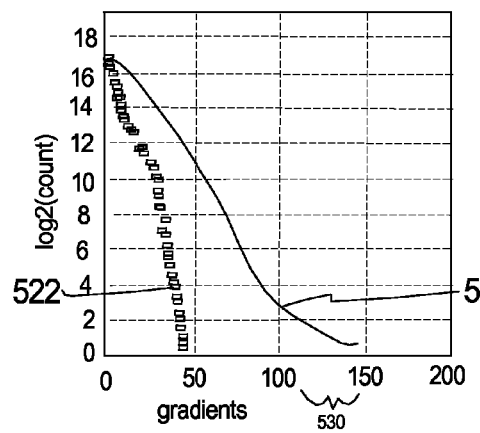
FIG. 5C is a graph that illustrates a histogram distribution of the absolute image gradient for the captured image of FIG. 5A, and an absolute value for a Gaussian model for the captured image of FIG. 5A.
Figure 5D:
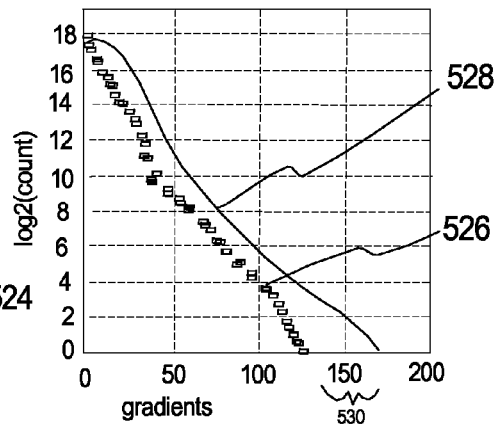
FIG. 5D is a graph that illustrates a histogram distribution of the absolute image gradient for the captured image of FIG. 5B, and an absolute value for a Gaussian model for the captured image of FIG. 5B.

More specifically, FIG. 5C is a graph that illustrates a histogram distribution of the absolute image gradient 522 for the entire captured image 510 of FIG. 5A, and an absolute value for a Gaussian model 524. Somewhat similarly, FIG. 5D is a graph that illustrates a histogram distribution of the absolute image gradient for the entire captured image 516 of FIG. 5B, and an absolute value for a Gaussian model 528. In this example, reviewing the tail section 530 in FIGS. 5C and 5D, neither of the images gradient histogram distributions 522, 526 is greater than its respective Gaussian Model 524, 528. Thus, both images 510, 516 would be found to be out of focus.

Referring back to FIGS. 5A and 5B, in certain embodiments, the present method can partition and divide the respective image 510, 516 into a plurality of equally sized, image regions 532 (illustrated with dashed lines), and an image gradient histogram distribution and a Gaussian model can be calculated for one, a plurality, or of the regions 532. Stated in another fashion, for example, each image 510, 516 can be partitioned into a plurality of regions 532 and a blur metric is computed separately for each of the plurality of regions 532.

The number, size and shape of the regions 532 can be varied according to the resolution of the images 510, 516. In non-exclusive examples, the regions 532 can be approximately 512 by 512 pixel blocks, or 256 by 256 pixel blocks. In the FIGS. 5A and 5B, twenty-five separate regions 532 are illustrated for reference. Moreover, each of the regions 532 are illustrated in these Figures as being square. It should be noted that the image can be partitioned into more than or fewer than twenty-five regions 532 and/or the regions 532 can have a shape other than square. Further, the maximum value of blur metric can be chosen as the blur metric for the whole image. Moreover, in certain embodiments, the blur metric may only be calculated for centrally located regions, for regions selected by the user, or image regions used for autofocus purposes of the camera.

In one embodiment, the region 532 size is based on the input image resolution. Basically, the total partitioned region 532 number is relatively constant for different resolutions. Therefore, for a high resolution input image, the block size is larger than the one with small resolution. For an image with low depth of field, e.g. macro, close-up, a relatively a small region 532 size (e.g. 128, 256) can be selected.

Additionally, one or more of the regions 532 can be further divided into sub-regions and a separate blur metric value can be selected for each sub-block.

Figure 5E:
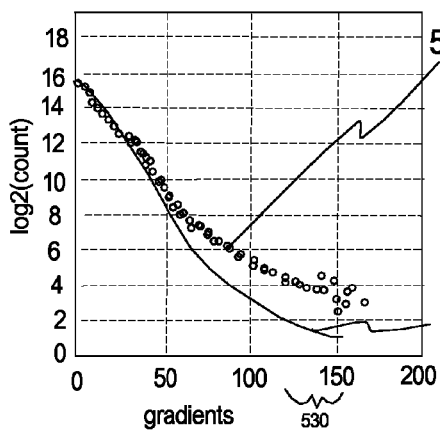
FIG. 5E is a graph that illustrates a histogram distribution of the absolute image gradient for one region of the captured image of FIG. 5A, and an absolute value for a Gaussian model for that region.
Figure 5F:
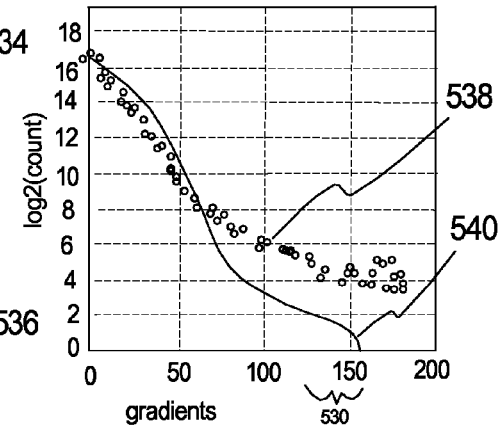
FIG. 5F is a graph that illustrates an absolute value for the image gradient histogram distribution for one region of the captured image of FIG. 5B, and an absolute value for a Gaussian model for that region.

FIG. 5E is a graph that illustrates a histogram distribution of the absolute image gradient 534 for one region 532 (having the largest blur metric value) of the captured image of FIG. 5A, and a positive distribution portion of a Gaussian model of that region 532. Somewhat similarly, FIG. 5F is a graph that illustrates a histogram distribution of the absolute image gradient 538 for one region 532 (having the largest blur metric value) of the captured image 516 of FIG. 5B, and a positive distribution of Gaussian model 540 of that region 532. In this example, reviewing the tail section 530 in FIGS. 5E and 5F, both of the images gradient histogram distributions 534, 538 are greater than its respective Gaussian Model 536, 540.

Thus, both images 510, 516 would be found to be in focus because at least one of the regions 532 in the respective image 510, 516 is in focus.

Figure 5G:
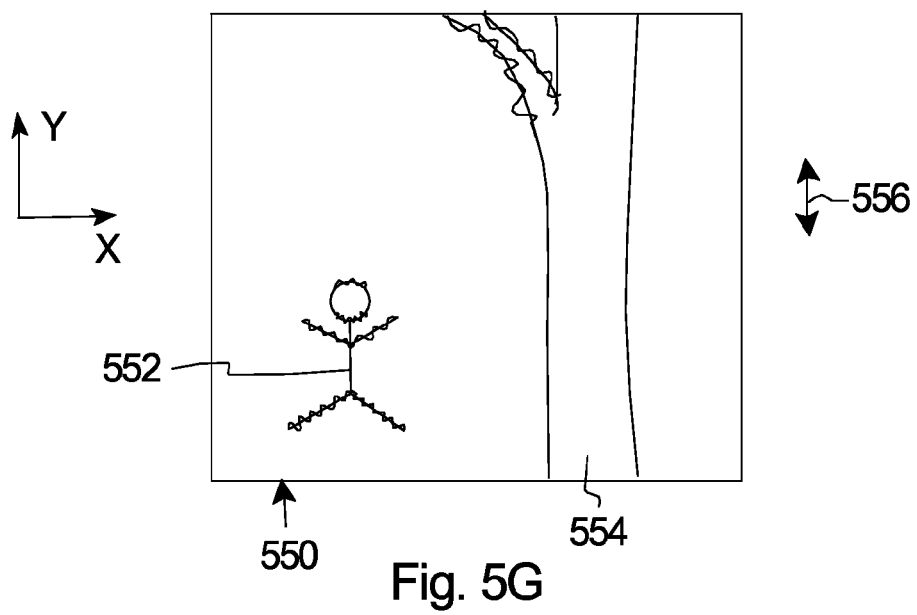
FIG. 5G is a simplified illustration of still another captured image.

FIG. 5G illustrates a blurred image 550 that may require slightly different processing. More specifically, FIG. 5G illustrates a person 552 and a tree 554. In this embodiment, a portion of the person 552 and a portion of the tree 554 are blurred (illustrated with wavy lines to depict blur) because the camera (not shown in FIG. 5G) was moved up and down vertically (illustrated with arrow 556 that represents the motion direction of the camera) while the image 550 was captured. In this embodiment, the portion of the tree 554 and the portion of the person 552 that are parallel with the motion direction 556 of the camera are sharp. As a result thereof, the methods described above may lead to a classification that the image 550 is sharp. However, the blur of the person 552 makes this image 550 not satisfactory.

Thus, in some embodiments, it can be desirable to test for motion blur of the image 550 prior to measuring the blur metric as described above.

Typically, in an image 550 with camera motion blur, the edges of the objects (e.g. the person 552 and the tree 554) along the motion direction 556 remain sharp. Thus, an image with large motion blur will likely have a dominant gradient direction related to the motion blur direction. In one embodiment, the method provided herein checks to determine whether there exists a dominant gradient direction. For example, image gradient directions can be analyzed to check if there exists a dominant gradient direction. If a dominant gradient direction exists, the method needs to confirm that it is true motion blur, and not sharp images having a dominant edge orientation. Typically, sharp images most likely contain other sharp structures than along detected possible motion direction. Stated in another fashion, sharp images typically contain sharp structures that are different than the detected possible motion direction. In contrast, with motion blur, the image most likely is only sharp along detected motion direction.

In certain embodiments, when evaluating gradient directions, long edge structures in the image should be identified and excluded from the computation of dominant gradient orientation. These long edges/structures are likely not caused by motion blur.

In one embodiment, the gradient directions are computed from a downsampled input image to reduce computational complexity. Long edge structures (such as the edges of the tree 554) will still remain as edge structures in a downsampled much smaller image; while short edge structures most likely will disappear in a much smaller image. In one non-exclusive embodiment, the downsampled image is approximately ⅛ of the size of the original image. In order to identify long edge structures, the edge structures in a much smaller downsampled images are computed (due to the fact the long edges will remain there, but short edges will disappear), the extracted long edge map is up sampled from low resolution to higher resolution and exclude them in the gradient direction computation.

It should be noted that other methods can be used to detect long edge structures in the image. For example, a Hough transform can be used to detect the long scene line structures.

Further, pixels with very small gradient values can be ignored when trying to determine if a dominant gradient direction exists. Thus, this evaluation will use only edge pixels having values greater than a predetermined threshold. (constrain Absolute values (Gx)+Absolute value (Gy) greater>than a predetermined threshold).

Moreover, isolated edge pixels can be ignored during testing for a dominant gradient direction because most isolated edge pixels are actually noisy pixels.

In one embodiment, the gradient directions can be separated into 10 bins from 0 to 180 with 20 degree apart. Subsequently, if the largest percentage amount (peak direction) exceeds a certain threshold, the dominanted gradient direction is selected as this peak direction. Compute the number of angles (largebin) with distribution>threshold (e.g., 10%). Large bin means the gradient direction inside counts more than certain percentage (i.e., 10%) of the total gradient direction amounts.

Determine if there exists peak gradient direction:

If (peak>threshold 1 & largebin<threshold 2)| (peak>threshold 3 & largebin<th4)

e.g. th 1=70%; th 2=5; th3=40%, th4=4.

In another embodiment, the dominant gradient direction can be estimated using a principal component analysis (PCA). In this example, a data set is formed from all the detected edge pixels, each data contains two components: x-direction gradient, y-direction gradient. Next, PCA is applied to these data sets to extract the $1^{st}$ component direction and its variance, $2^{nd}$ component direction and its variance. The ratio of the $1^{st}$ component variance to the $2^{nd}$ component variance is compared with some ratio threshold to determine if there exists dominant gradient direction. If yes, the $1^{st}$ component direction is the corresponding gradient direction.

In one non-exclusive embodiment, the ratio threshold ("TH") for the first component variance divided by the second component variance is greater than or equal to two if the ratio is greater than two, the image contains possible motion blur.

It should be noted that the ratio threshold can be lowered (e.g. TH≧1.6) if it is desired to include images with a weaker dominant gradient direction as possible motion blur. In contrast, the ratio threshold can be raised (e.g. TH≧5) if it is desired to select only images with strong dominant gradient direction as containing possible motion blur. In alternative, non-exclusive embodiments, the ratio threshold can be approximately 1.7, 1.8, 1.9, 2.1, 2.2, 2.3, 2.5, 3, 3.5, 4, or 4.5.

For an image 550 with detected possible motion blur, further verification is necessary to verify if the image is truly motion blurred or if it is a sharp image. As detailed above, a sharp image most likely contains sharp edges other than the detected motion direction; therefore it is sharp along the detected motion direction. However, a truly motion blurred image typically contains none or few large gradients along the detected motion direction, and therefore it is blurry along the detected motion direction (although it may look sharp perpendicular to the motion direction).

In one embodiment, in order to detect for possible motion blur, the sharpness degree of the image is checked along the detected motion blur direction. Stated in another fashion, first, the direction of motion is identified as provided above. In the FIG. 5G, the direction of motion is illustrated by arrow 556. Next, the image gradient histogram distribution is generated to represent how much difference in intensity exists between adjacent pixels along the possible direction of motion. In FIG. 5G, the possible motion direction is along the Y axis. This example can be represented as following equation:

$$Gy = G(i,j) - G(i, j+1)$$

where G(i,j) represents the intensity of a pixel located at i, j; and G(i, j+1) represents the intensity of a pixel located at i, j+1.

Subsequently, the image gradient histogram distribution is compared to the model gradient histogram to determine if the image is blurred or sharp.

Alternatively, if the possible motion direction is at a different angle, the intensity of the adjacent pixels along that motion direction are compared to generate the image gradient histogram distribution.

Figure 5H:
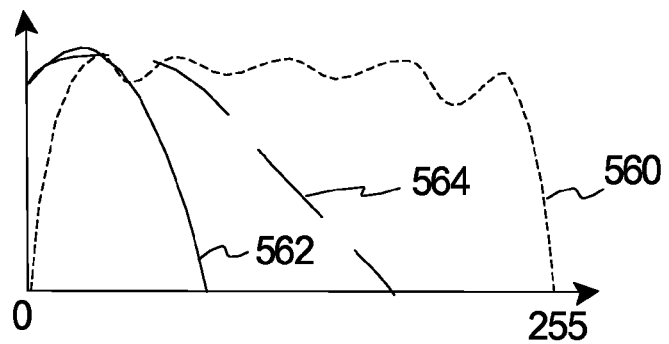
FIG. 5H is an intensity histogram that represents an image with good contrast, an image with poor contrast, and an image with adjusted contrast.

FIG. 5H is an intensity histogram that includes a line 560 (short dashes) that represents an image with good contrast, a line 562 (solid line) that represents an image with poor contrast, and a line 564 (long dashes) that represents an image with adjusted contrast. In certain situations, sharp images with low contrast can be incorrectly misclassified as blurry using one or more of the methods disclosed herein. Stated in another fashion, the image gradients are sensitive to image contrast level. Thus, a sharp block with low contrast can easily be misclassified as blurry. However, a blurry block with over-adjusted contrast can easily be misclassified as sharp.

Accordingly, in certain embodiments, the present invention tests one or more of the regions of the image to determine if the contrast of the regions is adequate, e.g. above a predetermined contrast threshold. Subsequently, if the contrast is not adequate, it can be increase/adjusted prior to performing the gradient testing methods disclosed herein.

For example, an intensity domain histogram curve of the image can be generated to determine if the contrast of the image is correct. An 8-bit greyscale image has 256 possible intensities (indexed from 0-255). The histogram curve illustrates the number of pixels in at image at each different intensity value. In FIG. 5H, line 560 illustrates the intensity domain histogram curve for an image having good contrast because there is a good distribution of the intensity values for the image. Further, in FIG. 5H, line 562 illustrates the intensity domain histogram curve for an image having poor contrast because there is a poor distribution of the intensity values for the image.

After it is determined that the image has poor contrast, the contrast can be adjusted (e.g. by linear mapping to a higher contrast) for at least a portion of the image if the contrast is determined to be below the predetermined threshold. In FIG. 5H, line 564 illustrates the adjusted intensity domain histogram curve for the poor contrast image. For example, the contrast of one or more of the regions can be linearly adjusted based on a histogram analysis of that region. In one embodiment, contrast adjustment can include finding low, high intensity value (skip 1% low and top pixels) and map them to [0 1]. For blocks with high contrast, the low can be restricted, and the high can be restricted in certain ranges to avoid over adjustment.

In certain embodiments, to avoid over adjusting the contrast, there is no contrast adjustment for regions with very dark colors, very high contrast blocks, or blocks with narrow intensity ranges.

Figure 5I:
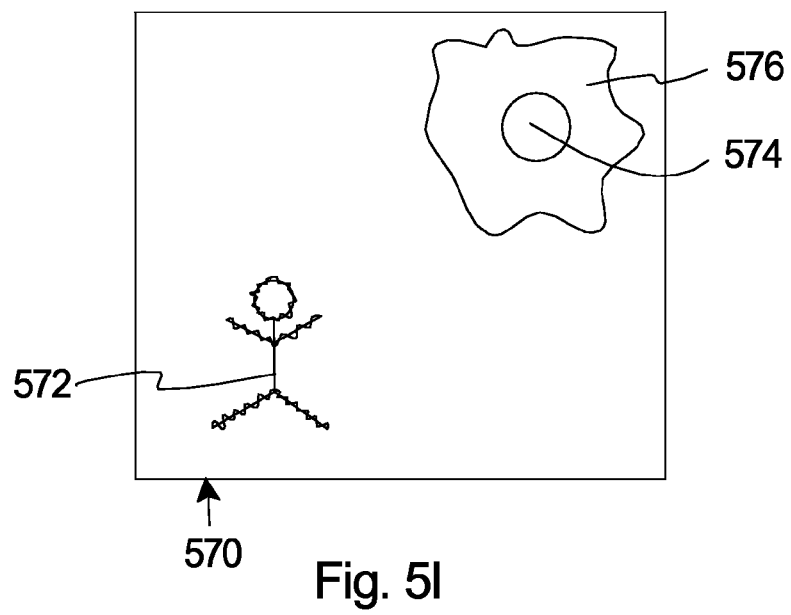
FIG. 5I is a simplified illustration of yet another captured image.

FIG. 5I is a simplified illustration of yet another captured image 570. In this embodiment, FIG. 5I illustrates a person 572 and a light 574. In this embodiment, the person 572 is blurred (illustrated with wavy lines to depict blur) as a result of motion blur. However, in this embodiment, the light 574 is saturated 576. With the saturation 576 of the light 574, the methods described above may lead to a classification that the image 570 is sharp. More specifically, the difference in intensity between the saturated light 576 and the pixels adjacent the saturated light 576 may lead to a classification that the image 570 is sharp. However, the blur of the person 572 and the saturated light 574 makes this image 570 not satisfactory.

Thus, in certain instances, blurred images with saturated lights can be easily misclassified as a sharp image. As a result thereof, in certain embodiments, the present invention detects saturated pixels and excludes them from the gradient distribution computation. For example, saturated seed pixels are selected by simply threshold method—followed by region growing around the seeds. More specifically, pixels having an intensity value of greater than a certain predetermined intensity threshold (e.g. greater than 240, greater than 250 or greater than 253) can be excluded from image gradient calculations.

Figure 6:
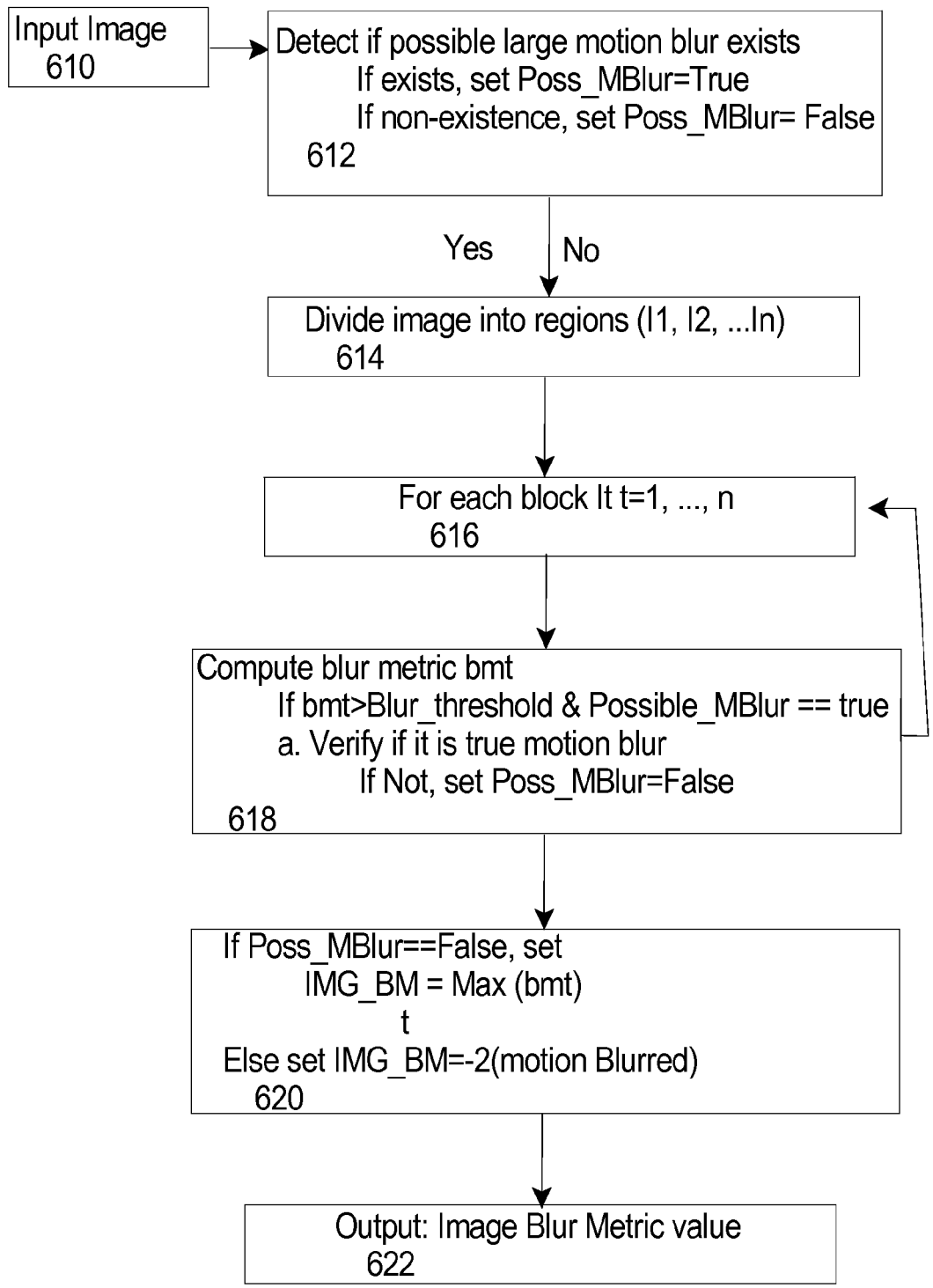
FIG. 6 is another flow chart that illustrates an image processing procedure having features of the present invention.

FIG. 6 is another flow chart that illustrates an image processing procedure that can be used with the first method. In this embodiment, the image is input at step 610. Next at step 612, the image is evaluated to detect if possible large motion blur exists in the image. This can be performed using the method described above. If a large motion blur exists, set Poss_MBlur=True. Alternatively, if large motion blur is non-existent, set Poss_MBlur=False. Subsequently, the image is divided into regions (I1, I2, . . . In) at block 614. Next, It (image block 1 with index t) is calculated for each of the regions at block 616. Subsequently, the blur metric value is calculated for each region at block 618. If bmt (blur metric value for block t (bm t))>a given threshold and Poss_MBlur==true, then verify if it is true motion blur. If not set Poss_MBlur=False. If the Poss_MBlur==false, then set image blur metric=maximum bmt. Alternatively, set image blur metric equal to motion blur.

Finally, the image blur metric value is outputted at block 622.

Figure 7A:
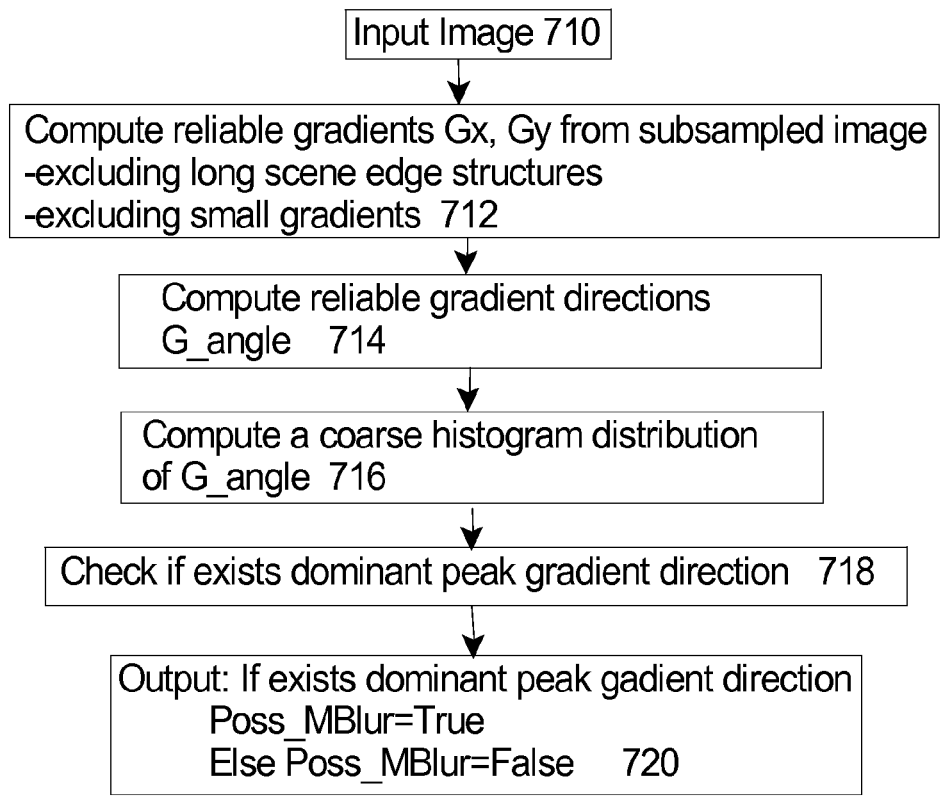
FIG. 7A is still another flow chart that illustrates an image processing procedure having features of the present invention.

FIG. 7A is still another flow chart that illustrates one method for detecting possible motion blur having features of the present invention. In this embodiment, the image is input at block 710. Next at block 712, gradients are computed along the X axis and the Y axis Gx, Gy from a subsampled image (excluding long scene edge structures and small gradients). Subsequently the gradients are computed to determine the gradient angles at block 714. Next, the coarse histogram distribution of the gradient angle is calculated at step 716. Subsequently, the coarse histogram distribution of the gradient angle is reviewed to determine if a dominant peak gradient direction exists at block 718. Finally, if a dominant peak gradient exists, the possible motion blur is set to true (Poss_MBlur=True) or if no dominant peak gradient exists, the possible motion blur is set to false (Poss_MBlur=False) at block 720.

Figure 7B:
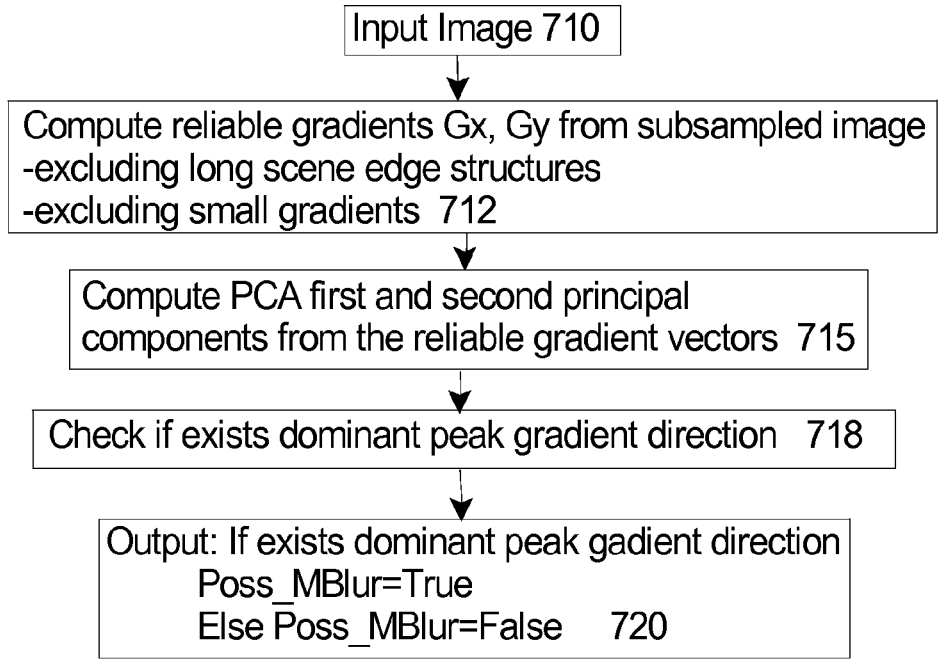
FIG. 7B is another flow chart that illustrates an image processing procedure having features of the present invention.

FIG. 7B is still another flow chart that illustrates another possible method for detecting possible motion blur having features of the present invention that includes four steps that are the same as the procedure illustrated in FIG. 7A and described above. In this embodiment, the image is again input at block 710. Next at block 712, gradients are again computed along the X axis and the Y axis Gx, Gy from a subsampled image (excluding long scene edge structures and small gradients). Subsequently the first and second principal components are computed from the reliable gradient vectors at block 715. Next, the ratio of the first component variance and the second component variance is compared to a ratio threshold to determine if a dominant peak gradient direction exists at block 718. Finally, if a dominant peak gradient exists, the possible motion blur is set to true (Poss_MBlur=True) or if no dominant peak gradient exists, the possible motion blur is set to false (Poss_MBlur=False) at block 720.

Figure 8:
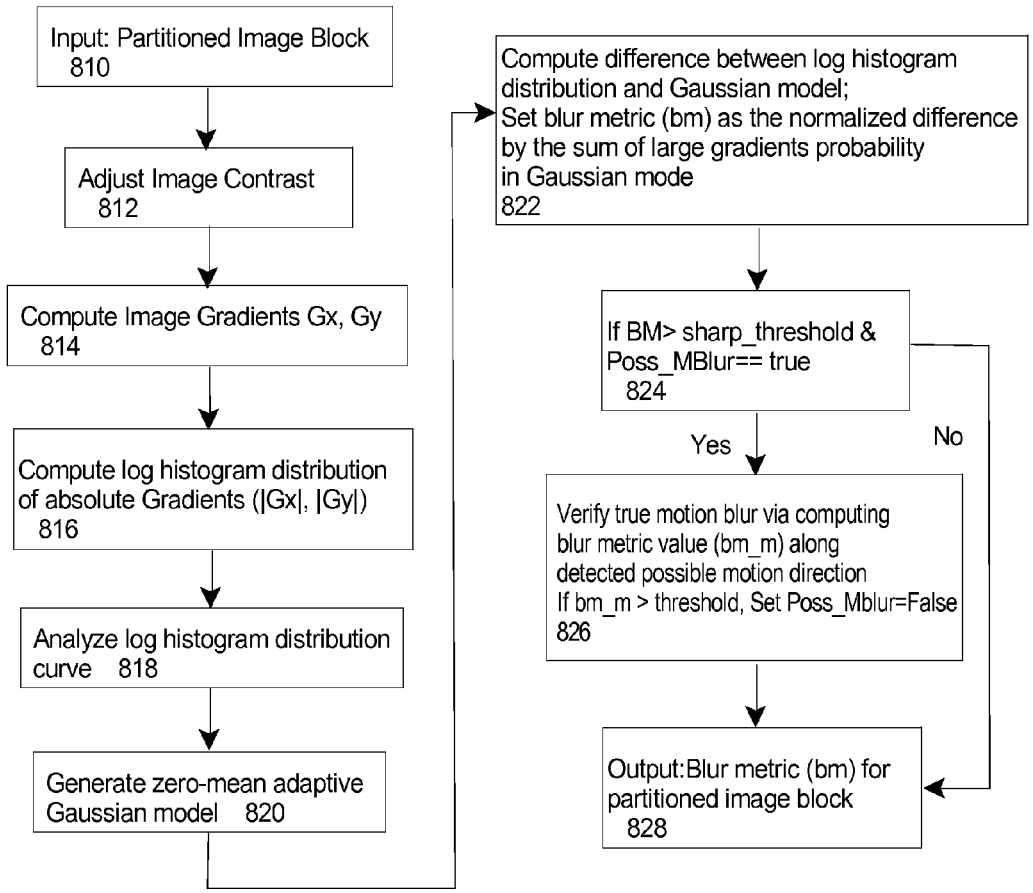
FIG. 8 is yet another flow chart that illustrates an image processing procedure having features of the present invention.

FIG. 8 is yet another flow chart that illustrates an image processing procedure having features of the present invention. At block 810 the input image is partitioned into regions. Next, the contrast of each region is evaluated and adjusted if necessary at block 812. Subsequently, image gradients Gx, Gy along the X axis and the Y axis are computed at block 814.

Next, the log histogram distribution of absolute gradients is computed at block 816. Next, the log histogram distributions curve is analyzed at block 818. Subsequently, the zero-mean adaptive Gaussian model is generated at block 820.

Next, the difference between the log histogram and Gaussian model is computed, the blur metric is set as the normalized difference by the sum of large gradients probability in Gaussian mode at block 822.

Subsequently, if the blur metric is greater than a predetermined threshold and the possible motion blur is true at step 824. If yes, the true motion blur is computed. Finally, the blur metric value for the portioned image block is output at block 828. If yes, we need to further check to verify it is motion blur or sharp image with dominant edges. If no, we can output blur metric results.

Figure 9A:
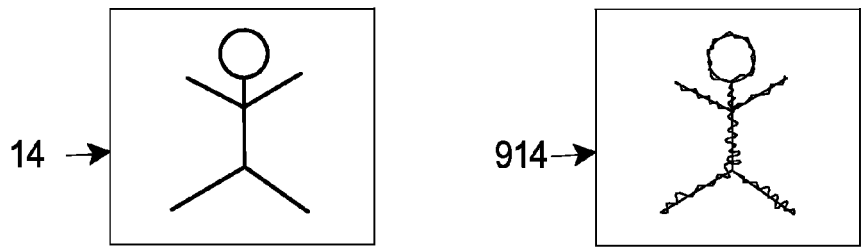
FIG. 9A is a simplified illustration of the first image and a blurred first image.
Figure 9B:
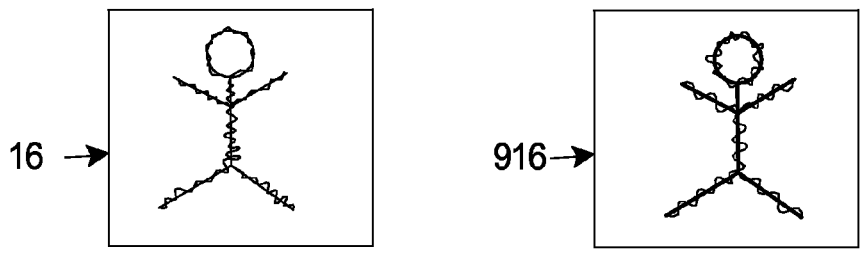
FIG. 9B is a simplified illustration of the second image and a blurred second image.

FIG. 9A is a simplified illustration of the first image 14 and a blurred first image 914, and FIG. 9B is a simplified illustration of the second image 16 and a blurred second image 916. In this embodiment, the blurred first image 914 that was generated by artificially blurring (using a low pass filter for example) the first image 14, the blurred second image 916 was generated by artificially blurring (using a low pass filter for example) the second image 16. Blurring is again represented by wavy lines. It should be noted that there is a much greater difference between the artificially blurred first image 914 and the first captured image 14, than the artificially blurred second image 916 and the second captured image 16. Stated in another fashion, the sharper the original image, the greater the difference there will be between the original image and artificially blurred original image. Further, the blurrier the original image, the smaller the difference there will be between the original image and artificially blurred original image.

Figure 9C:
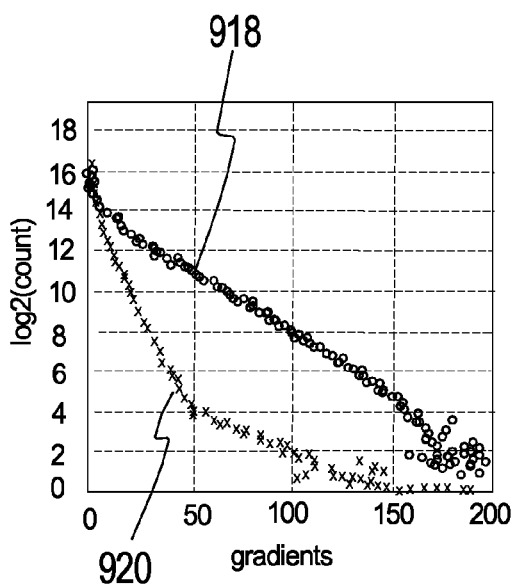
FIG. 9C is a graph that illustrates a histogram distribution of the absolute image gradient for the first image, and a histogram distribution of the absolute image gradient for a blurred first image.
Figure 9D:
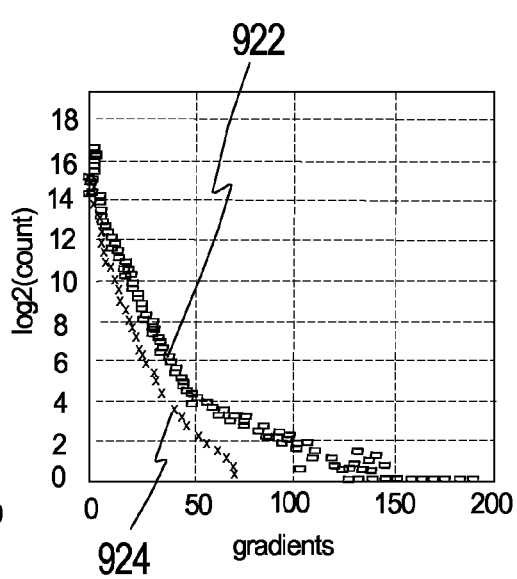
FIG. 9D is a graph that illustrates a histogram distribution of the absolute image gradient for the second image, and a histogram distribution of the absolute image gradient for a blurred second image.

FIG. 9C is a graph that illustrates a histogram distribution of the absolute image gradient 918 for the first image 14, and a histogram distribution of the absolute image gradient 920 for the blurred first image 914. Somewhat similarly, FIG. 9D is a graph that illustrates a histogram distribution of the absolute image gradient 922 for the second image 16, and a histogram distribution of the absolute image gradient 924 for the blurred second image 916.

In this embodiment, the present invention computes a distribution probability difference to estimate if the image 14, 16 is either blurred or sharp. For example, the image gradient histogram distribution 918 for the first image 14 is compared to the image gradient histogram distribution 920 for the blurred first image 914 to determine if the first image 14 is sharp or blurred. Similarly, the image gradient histogram distribution 922 for the second image 16 is compared to the image gradient histogram distribution 924 for the blurred second image 916 to determine if the second image 16 is sharp or blurred. Typically, the less the difference, the more likely the given original image is blurred, while the bigger the difference, the more likely the image is sharp.

Figure 10:
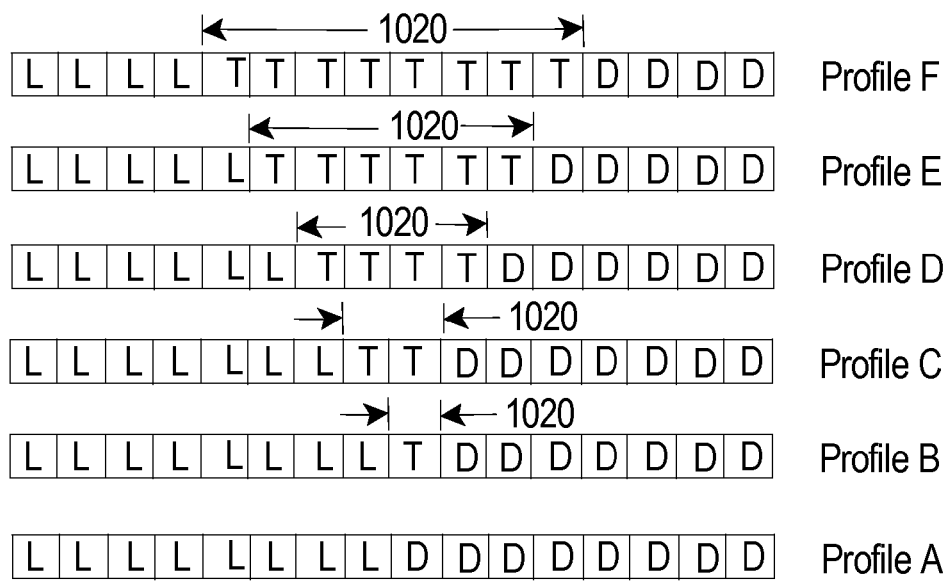
FIG. 10 is a simplified chart that illustrates alternative defocus blur kernel sizes of an edge.

The second, defocus blur size procedure for estimating if the image is blurred or sharp will be described with initial reference to FIG. 10. It should be noted that with defocus blur, a point of light will appear as a circle of light, with the diameter of the circle corresponding to the blur kernel size. Stated in another fashion, defocus blur is typically disk shaped, with a strong correlation between each pixel and its neighboring pixels. FIG. 10 is a simplified chart that illustrates profiles of possible alternative blur kernel widths 1020 of an edge in an image (not shown) along a single axis. In this chart, "L" represents light grey pixels, "D" represents dark grey pixels, and "T" represents the transition pixels between light grey pixels and dark grey pixels.

In the profile A (the bottom profile), the edge changes immediately from light grey pixels to dark grey pixels without any transition pixels. Thus, profile A has a blur kernel size 1020 of zero. In contrast, profile B (the second from the bottom), the edge has a single transition pixels between the light grey pixels and the dark grey pixel. Thus profile B has a blur kernel size 1020 of one. Further, (i) profile C (the third from the bottom) has two transition pixels and a blur kernel size 1020 of two; (ii) profile D (the fourth from the bottom) has four transition pixels and a blur kernel size 1020 of four; (iii) profile E (the second from the top) has six transition pixels and a blur kernel size 1020 of six; and (iv) profile F (the top profile has eight transition pixels and a blur kernel size 1020 of eight. In this graph, the edge in profile A is completely in focus. Further, the degree of blur of the edge increases for each subsequent profile from the bottom to the top of the graph.

It should be noted that in FIG. 10, the blur is illustrated along a single axis. However, for a typical pixel arrangement, the defocus blur is typically isotropic, disk shaped, with a strong correlation between each pixel and its neighboring pixels.

Figure 11:
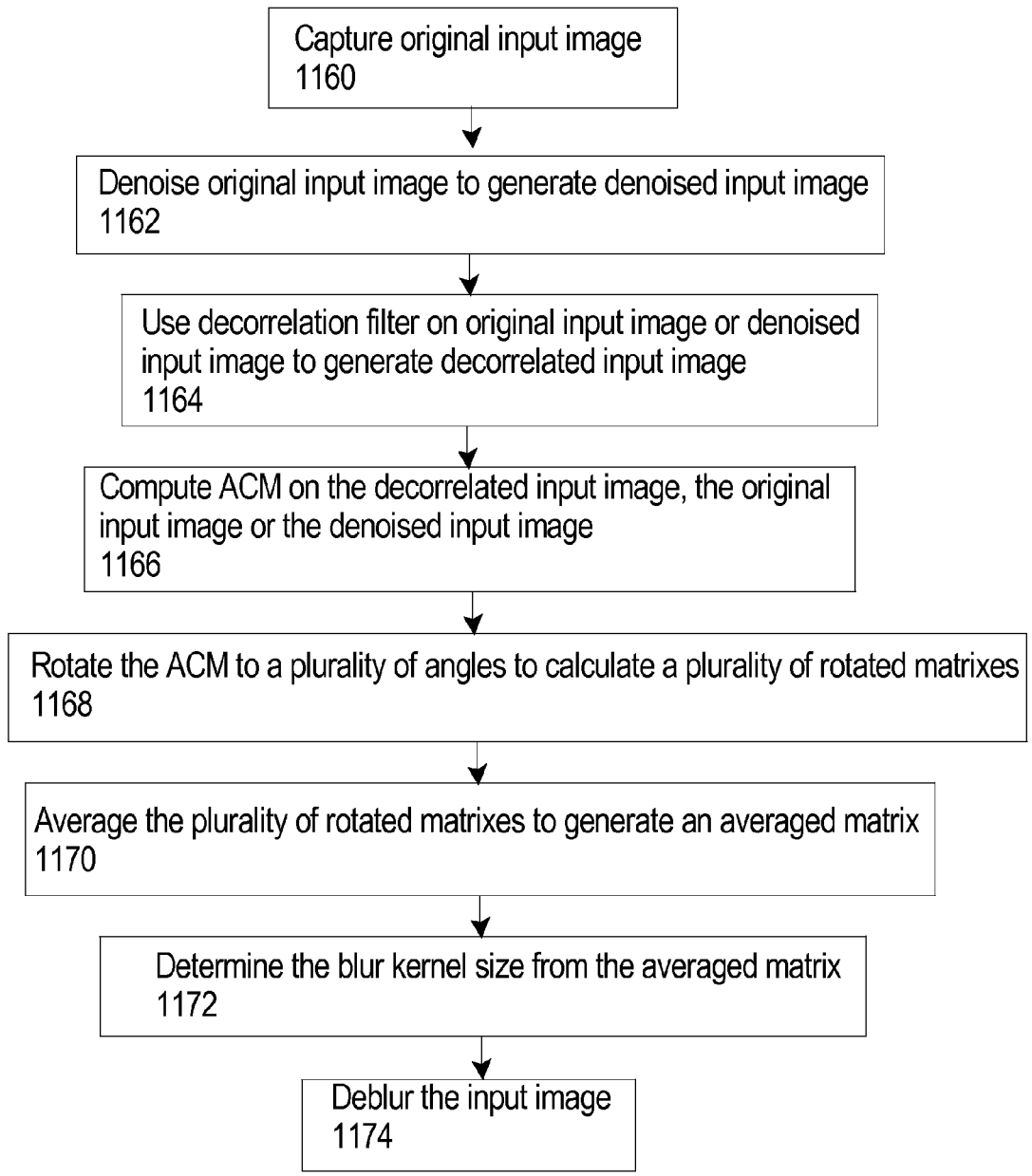
FIG. 11 is a flow chart that illustrates the steps used to estimate the blur kernel size and subsequently deblur the input image.

FIG. 11 is a flow chart that illustrates one or more of the steps used to estimate the blur kernel size 1020 (illustrated in FIG. 10) and subsequently, optionally deblur the input image 14 (illustrated in FIG. 1). In one embodiment, at step 1160, the image apparatus 10 (illustrated in FIG. 1) captures the original input image 14. Next, at step 1162, the control system 24 (illustrated in FIG. 1) can denoise the original input image 14 if the original input image 14 is noisy to generate a denoised input image. For example, the original input image 14 can sometimes include artifacts caused by noise. In one embodiment, a smooth region (a region that is substantially uniform in color) of the input image 14 is analyzed to determine if the input image 14 includes noise. If the smooth region has a variation in color, these variations can be attributed to noise. A number of algorithms currently exist for detecting and reducing noise from an input image. One suitable algorithm used for reducing noise is commonly referred to as a wavelet based denosing algorithm as disclosed by Portiall, J. Strela, V. Wainwright, Simoncelli, in "Image denoising using scale maixtures of gaussians in the wavelet domain", IEEE Trans. On Image Processing 2003, the contents of which are incorporated herein by reference.

It should be noted that if the original input image 14 is relatively free of noise, that step 462 can be unnecessary and can be optional.

Subsequently, at step 1164, the control system 24 can use a decorrelation filter on the original input image or the denoised input image to reduce content correlation from the original input image or the denoised input image to create a decorrelated input image. Content correlation in an image relates to the correlation between a pixel and its neighbors that results from the pixels capturing similar colors from the same object in the scene. For example, if a portion of an image includes a wall that is uniform in color, all of the pixels of the image that represent that wall will have a strong correlation that results from the wall being uniform in color. Thus, the structures in scene influence the correlation between a pixel and its neighbors. The present invention reduces the amount of content correlation during the procedure to determine the blur size.

As provided herein, the decorrelation filter reduces the amount of content correlation from the original input image or the denoised input image. In certain embodiments, the decorrelation filter removes most or almost all of the content correlation. As provided herein, when the content correlation is completely removed, the remaining correlation within the original input image or the denoised input image can be associated with blur.

In one, non-exclusive embodiment, the decorrelation filter is a Laplace type filter. A Laplacian is an isotropic measure of the $2^{nd}$ derivative of an image. As an example, a 3×3 Lapalacian Filter can be expressed as follows:

[−1 −1 −1]
[−1  8 −1]
[−1 −1 −1]

As provided herein, when the Lapalacian filter is applied to the image, the regions of rapid intensity changes in the image are highlighted.

The size of the Laplace filter can be varied to achieve the desired level of decorrelation. In non-exclusive examples, the Laplace filter can be a 3×3, 5×5, 7×7, or 9×9 filter. It should be noted that with the Laplace filter, in a region that is uniform in brightness, the result is to reduce the grey level to zero. When discontinuity is present within the neighborhood of the (e.g. a point, line or edge), the result is a non-zero grey level value. Alternatively, the decorrelation filter can be an adaptive filter that adjusts to the content of the original input image or the denoised input image.

Subsequently, at step 1166, the control system 24 computes an autocorrelation matrix ("ACM") for the decorrelated input image. The ACM can be generated by comparing the decorrelated input image ("input matrix") with a shifted version of the decorrelated input image ("shifted matrix"). In one embodiment, to generate the ACM, the control system computes the correlation in intensity between the pixels of the decorrelated input image and the pixels of the shifted version of the decorrelated input image. Basically, the ACM represents the correlation input matrix and its shifted matrix.

In alternative embodiments, the ACM can be generated by the control system from the original input or the denoised input image.

Figure 12A:
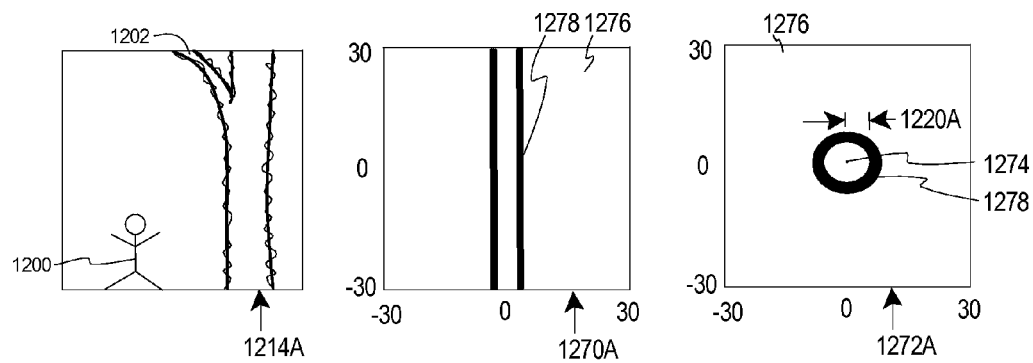
FIG. 12A illustrates a simplified input image, a simplified autocorrelation matrix for the input image, and a simplified average autocorrelation matrix for the input image.

FIG. 12A illustrates one simplified example of an original input image 1214A, and the resulting ACM 1270A from the decorrelated input image. In this embodiment, the ACM 1270A has a shifted range of thirty. Stated in another fashion, the pixels have been shifted thirty to the left, thirty to the right, thirty up, and thirty down. Alternatively, the ACM can have a larger or smaller shifted range than thirty.

In this example, the original input image 1214A is a simplified image of a person 1200 (illustrated as a stick figure) and a portion of a tree 1202. In this embodiment, the person 1200 is in focus, while the tree 1202 (illustrated with wavy lines to depict blur) is in the background and is not in focus.

For the matrixes illustrated herein, the white area 1276 represents a low/small correlation (a negative value) between the pixels, while the dark area 1278 represents a high/strong correlation (a positive value) between the pixels.

A review of the resulting ACM 1270A reveals that the features and content ("scene structure") of the original image 1214A can bias the ACM 1270A. More specifically, in FIG. 12A, the scene structure of the vertical transition between the tree and the rest of the scene clearly biases the resulting ACM 1270A to have a high correlation area 1278 that is vertically biased. Thus, in this example, when the input image has been shifted vertically, there is a strong correlation between the input image and the shifted image because of the objects (e.g. the tree) in the scene. As a result thereof, the dominant edges of the structures in the scene can bias and influence the resulting ACM 1270A. Thus, the decorrelation filter is not able to completely eliminate the content correlation from the input image.

It should be noted that if the transitions/edges of the objects in that scene are at an angle relative to vertical, such as a pitched roof, or another angled structure, the resulting ACM will have a somewhat similar angled bias.

Referring back to FIG. 11, next, at step 1168, the control system rotates the ACM 1270A around it's center to a plurality of alternative angles to calculate a plurality of rotated ACM matrixes. In alternative, non-exclusive examples, the control system can rotate the ACM 1270A in increments of 2, 5, 10, 20, 25, 30, 45, or 60 degrees. In one example, if the control system is programmed to rotate the ACM 1270A in five degree increments, the control system will calculate 72 rotated matrixes from the ACM 1270A. Standard procedures can be use to rotate the matrix. As used herein, rotation means that each pixel is moved around the rotation center for a specified angle amount.

Next, at step 1170, the control system averages the plurality of individual rotated matrixes to calculate an averaged matrix 1272A (illustrated in FIG. 12A). For example, the control system can add together the individual rotated matrixes and subsequently divide by the total number of individual rotated matrixes. The result is the averaged matrix 1272A. In the example provided above with the five degree increments, the control system will sum the 72 rotated matrixes together and subsequently divide that total by 72.

As provided herein, averaging the plurality of matrixes reduces the bias from scene structure. More specifically, because out of focus blur is generally isotropic shaped, it is indifferent to rotation. In contrast, the scene structure is typically not isotropic, and thus, the scene structure is typically not indifferent to rotation. As a result thereof, the averaged matrix 1272A will have further reduced the scene structure bias, while not influencing the out of focus blur. Thus, the resulting averaged matrix 1272A has a high correlation area 1278 (positive value) that is generally disk shaped and the high correlation area 1278 no longer includes significant scene structure bias.

From the averaged matrix 1272A, the blur size 1220A can be determined. More specifically, as provided herein, the disk shaped high correlation area 1278 of the averaged matrix 1272A corresponds to the amount of defocus blur 16 (illustrated in FIG. 1) in the input image 14 (illustrated in FIG. 1). In one embodiment, the control system 24 (illustrated in FIG. 1) calculates a distance between a middle 1274 of the averaged matrix 1272A and the inner edge of the disk shaped high correlation area 1278. The control system 24 then sets this distance as equal to an estimated blur size 1220A. Stated in another fashion, in one embodiment, the estimated blur size 1220A is equal to a radius of the high correlation area 1278 of the averaged matrix 1272A.

In the embodiment illustrated in FIG. 12A, the high correlation area 1278 of the averaged matrix 1272 has a radius of approximately eight pixels. Thus, in this example, the control system 24 will estimate the blur size 1220A to be eight pixels.

As provided herein, the averaged matrix 1272 reveals the true autocorrelation of the blur size 1220A while removing the scene-structure bias. Moreover, the averaged ACM eliminates the residual content correlation and reduces the influence of features in the image.

As provided herein, in certain embodiments, the image 1214A can be classified as sharp if the defocus blur size 1220A is smaller than a predetermined threshold blur size. In one non-exclusive example, the predetermined threshold blur size is four pixels. In this embodiment, (i) if the estimated defocus blur size 1220A for the image 1214A is less than four pixels, the image 1214A can be classified as sharp, and (ii) if the estimated defocus blur size 1220A for the image 1214A is equal to or great than four pixels, the image 1214A can be classified as blurred. Alternatively, for example, the predetermined threshold blur size can be two, three, five, six, or seven pixels.

Figure 12B:
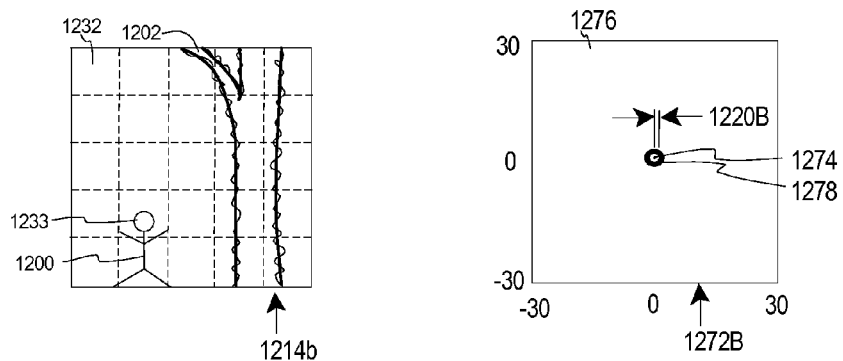
FIG. 12B illustrates the simplified input image of FIG. 12A, and a simplified average autocorrelation matrix for a portion of the input image.

Referring to FIG. 12B, in certain embodiments, for the defocus blur size method, the image 1214B can be divided into a plurality of image regions 1232 and the defocus blur size is calculated for each of the image regions 1232. In this embodiment, the image regions 1232 can be similar to the image regions 532 described above and illustrated in FIG. 5A. Further, in this embodiment, the image 1214B can be classified as sharp if the defocus blur size 1220B in any of the image regions 1232 is smaller than the predetermined threshold blur size. In this embodiment, (i) if the estimated defocus blur size 1220B for any of the image regions 1232 is less than the predetermined threshold blur size, the image 1214B can be classified as sharp, and (ii) if the estimated defocus blur size 1220B of each of image regions 1232 is equal to or great than the predetermined threshold blur size, the image 1214A can be classified as blurred.

Alternatively, in this embodiment, to save computations, the defocus blur size 1220B can be calculated for only certain, selected image regions 1232. As non-exclusive examples, the defocus blur size 1220B can be calculated for (i) image regions 1232 with texture (avoid too smooth image regions), (ii) image regions 1232 with blur metric value (described above) higher than a certain threshold (avoid too blurry image regions), (iii) image regions 1232 related to a region of interest to the user (e.g. regions manually selected by the user), or (iv) image regions 1232 used for auto-focus purposes of the camera. By computing the defocus blur size 1220B in a selective way, the amount of computation is reduced while the blur estimation accuracy is still improved.

For example, if the camera used to capture the image 1220B utilized face recognition software when focusing the camera to capture image 1220B, the image region 1232 that includes a face 1233 of the person 1220 can be selected for defocus blur size estimation. Alternatively, one or more other image regions 1232 can be selected for defocus blur size estimation.

FIG. 12B also illustrates the averaged matrix 1272B for one of the selected image regions 1232 (e.g. the image region 1232 that captured the face 1233). In this embodiment, the control system 24 (illustrated in FIG. 1) can (i) use a decorrelation filter on the selected image region 1232 to reduce the content correlation, (ii) generate an autocorrelation matrix ("ACM") for the decorrelated image region, (iii) rotate the ACM around it's center to a plurality of alternative angles to calculate a plurality of rotated ACM matrixes, and (iv) average the plurality of individual rotated matrixes to calculate an averaged matrix 1272B. Subsequently, from the averaged matrix 1272B of the image region 1232, the control system 24 can estimate the defocus blur size of that image region 1232. More specifically, the disk shaped high correlation area 1278 of the averaged matrix 1272B corresponds to the amount of defocus blur for that image region 1232.

In this example, the control system 24 calculates a distance between the middle 1274 of the averaged matrix 1272B and the inner edge of the disk shaped high correlation area 1278. The control system 24 then sets this distance as equal to an estimated blur size 1220B. In the embodiment illustrated in FIG. 12B, the high correlation area 1278 of the averaged matrix 1272 has a radius of approximately two pixels. Thus, in this example, the control system 24 will estimate the blur size 1220B to be two pixels.

In this example, the image 1214B can be classified as sharp if the defocus blur size 1220B of the selected image region 1232 is smaller than the predetermined threshold blur size.

In certain embodiments, depending upon the image, the resulting averaged matrix can have multiple, spaced apart annular shaped high correlation areas.

For example, an image with a truly small defocus blur size can have a relatively small diameter, high correlation area, and a relatively large diameter high correlation area. Further, in certain embodiments, input images containing heavy noise or images lacking textures can lead to multiple high correlation areas that can lead to an incorrect defocus blur kernel estimation. In these embodiments, the control system 24 will need to select the proper high correlation area to estimate the blur size.

Figure 13A:
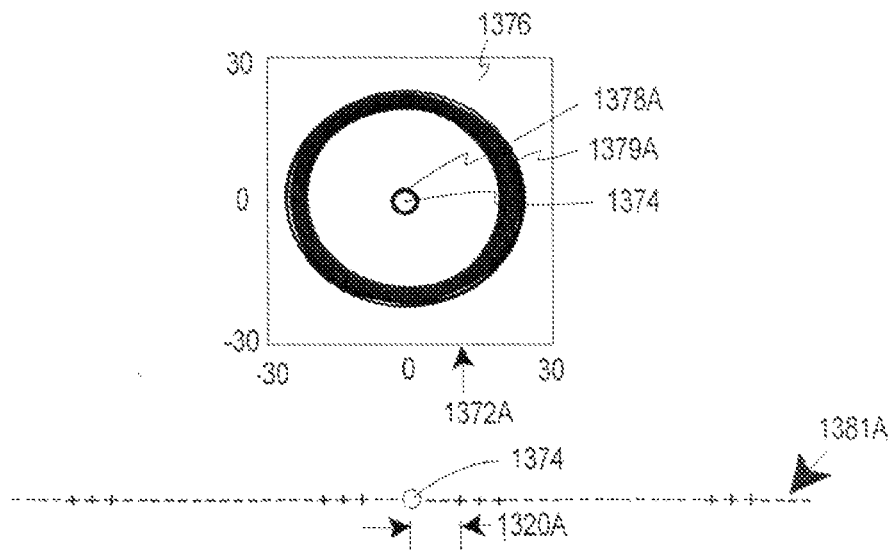
FIGS. 13A, 13B, and 13C illustrate three simplified alternative averaged matrixes that results from three alternative input images.

FIG. 13A illustrates an averaged matrix 1372A for an image (not shown) having a small defocus blur size. In this example, the averaged matrix 1372A has a first high correlation area 1378A that is centered around the middle 1374 and a second high correlation area 1379A that is also centered around the middle 1374. In this example, the first high correlation area 1378A has an inner radius of approximately two pixels and the second high correlation area 1379A has an inner radius of approximately twenty pixels.

FIG. 13A also illustrates a one dimensional pixel array 1381A for a portion of the pixels of the averaged matrix 1372A with negative signs ("−") that represent low correlation areas 1376, positive signs ("+") that represent high correlation areas 1378A, 1379A, and a circle that represents the middle 1374.

Figure 13B:
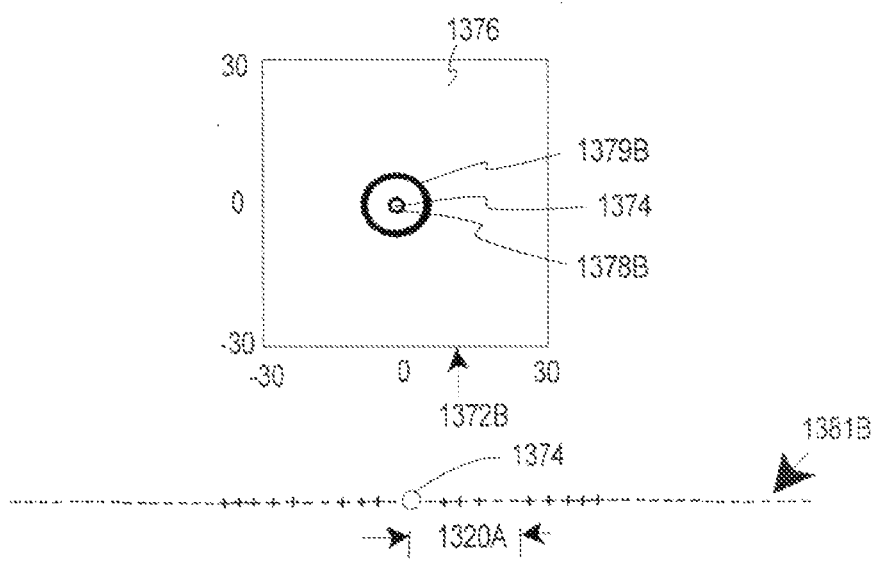

FIG. 13B illustrates an averaged matrix 1372B for another image (not shown) having a relatively moderate defocus blur size. In this example, the averaged matrix 1372B again has a first high correlation area 1378B that is centered around the middle 1374 and a second high correlation area 1379B that is also centered around the middle 1374. In this example, the first high correlation area 1378B has an inner radius of approximately one pixel and the second high correlation area 1379B has an inner radius of approximately seven pixels.

FIG. 13B also illustrates a one dimensional pixel array 1381B for a portion of the pixels of the averaged matrix 1372B with negative signs ("−") that represent low correlation areas 1376, positive signs ("+") that represent high correlation areas 1378B, 1379B, and a circle that represents the middle 1374.

Figure 13C:
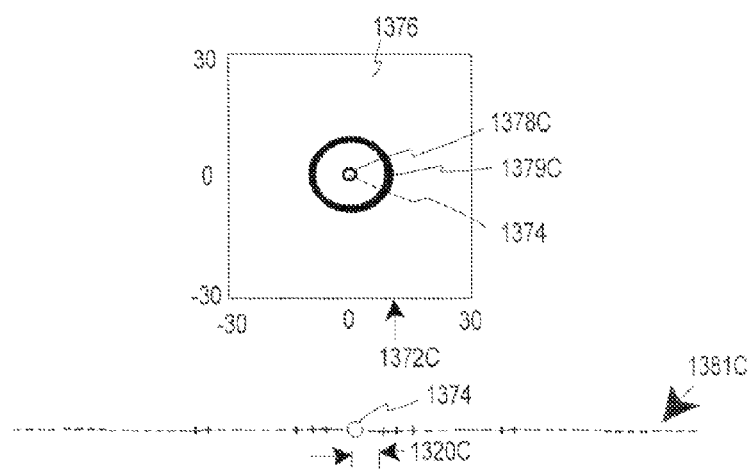

FIG. 13C illustrates an averaged matrix 1372C for yet another image (not shown) having a relatively large defocus blur size. In this example, the averaged matrix 1372C again has a first high correlation area 1378C that is centered around the middle 1374 and a second high correlation area 1379C that is also centered around the middle 1374. In this example, the first high correlation area 1378C has an inner radius of approximately one pixel and the second high correlation area 1379C has an inner radius of approximately ten pixels.

FIG. 13C also illustrates a one dimensional pixel array 1381C for a portion of the pixels of the averaged matrix 1372C with negative signs ("−") that represent low correlation areas 1376, positive signs ("+") that represent high correlation areas 1378C, 1379C, and a circle that represents the middle 1374.

In the embodiments illustrated in FIGS. 13A-13C, the control system 24 will need to select the proper high correlation area to estimate the blur size.

In one embodiment, if the first detected low correlation area of the averaged matrix is less than a predetermined low threshold, the control system checks if the averaged matrix is the result of a small kernel size or a noise biased averaged matrix. For example, the predetermined low threshold can be five. In the examples illustrated in FIGS. 13A-13C, each of the averaged matrixes 1372A-1372C has a first detected low correlation area that is less than five. Thus in these examples, the control system needs to perform additional analysis to determine if the averaged matrix is the result of a small kernel size or a noise biased averaged matrix.

In one embodiment, the control system evaluates the second high correlation area 1379A-1379C to determine if the averaged matrix is the result of a small kernel size or a noise biased averaged matrix. In one non-exclusive example, if the second high correlation area 1379A-1379C has a radius that is less than a predetermined radius threshold, the control system selects the radius of the second high correlation area 1379A-1379C as the blur size. Alternatively, if the second high correlation area 1379A-1379C has a radius that is greater than the predetermined radius threshold, the control system selects the radius of the first high correlation area 1378A-1378C as the blur size.

In one non-exclusive example, the predetermined radius threshold can be eight. Using this example, in FIG. 13A, the second high correlation area 1379A has a radius that is greater than the predetermined radius threshold (twenty is greater than eight). Thus, the control system selects the radius of the first high correlation area 1378A as the blur size. Thus, in this example, in FIG. 13A, the blur size is two.

Also, using the predetermined radius threshold of eight, in FIG. 13B, the second high correlation area 1379B has a radius that is less than the predetermined radius threshold (seven is less than eight). Thus, the control system selects the radius of the second high correlation area 1379B as the blur size. Thus, in this example, in FIG. 13B, the blur size is seven.

Further, using the predetermined radius threshold of eight, in FIG. 13C, the second high correlation area 1379C has a radius that is greater than the predetermined radius threshold (ten is greater than eight). Thus, the control system selects the radius of the first high correlation area 1378C as the blur size. Thus, in this example, in FIG. 13C, the blur size is one.

Again referring back to FIG. 11, finally, at step 1174, the control system can deblur the input image 14 utilizing the estimated blur size to generate the blur kernel and provide the deblurred adjusted image 55. It should be noted that defocus blur can be corrected relatively easily once the blur size is estimated. One suitable algorithm used for deblurring the input image 10 is commonly referred to as Lucy-Richarson iterative restoration algorithm.

In certain embodiments, when there is significant defocus blur, the control system 24 (illustrated in FIG. 1) can first downsample the input image to simplify the computations. Stated in another fashion, in certain embodiments, using the present method, it is easier to estimate smaller defocus blur than larger defocus blur. Thus, the control system 24 downsamples the input image to reduce the amount of defocus blur. As provided herein, any of the methods and procedures disclosed herein can be performed on a downsampled image instead of the original input image to reduce computational complexity.

Figure 14A:
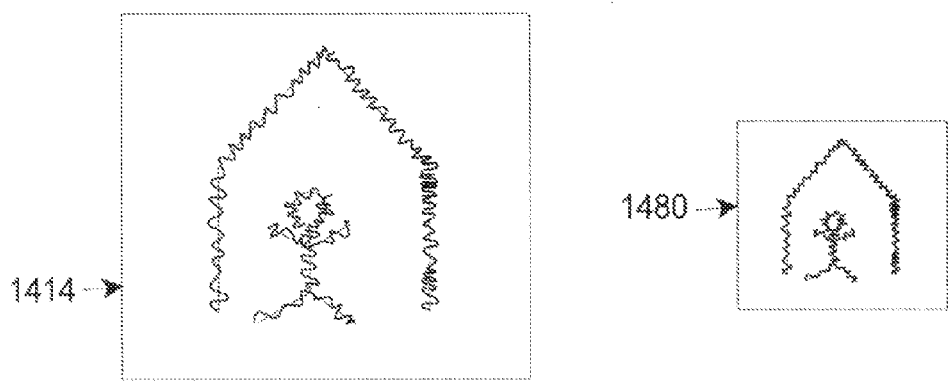
FIG. 14A illustrates an input image, and a simplified, downsampled input image.

FIG. 14A illustrates the original input image 1414 and a downsampled version 1480 of the input image 1414. In alternative, non-exclusive embodiments, the downsampled image 1480 is approximately 10, 20, 25, 30, 45, or 50 percent of the size of the original input image 1414. In one non-exclusive embodiment, downsampling of the original input image 1414 can be done by bicubic downsampling. In this example, the downsampled image 1480 is approximately 50 percent of size of the original input image 1414.

Figure 14B:
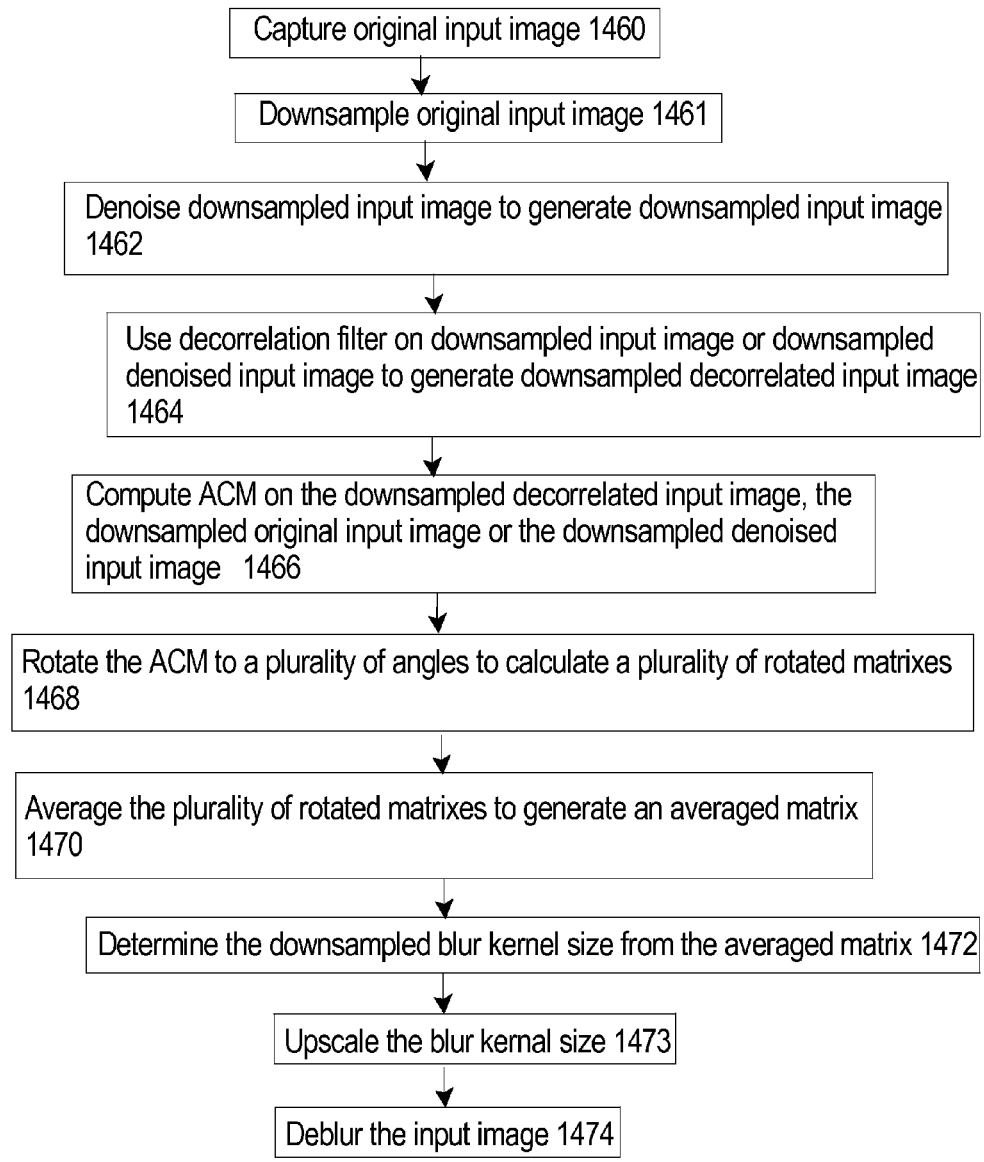
FIG. 14B is a flow chart that illustrates another embodiment of the steps used to estimate the blur kernel size and subsequently deblur the input image.

FIG. 14B is a flow chart that illustrates one or more of the steps used to estimate the blur kernel size 1020 (illustrated in FIG. 10) for a heavily defocus blurred image, and subsequently deblur the input image 14 (illustrated in FIG. 1). Many of the steps illustrated in FIG. 14B are similar to the steps described above and illustrated in FIG. 11.

In one embodiment, at step 1460, the image apparatus 10 (illustrated in FIG. 1) captures the original input images 14, 16.

Subsequently, at step 1461, the control system 24 can downsample the original input image. Next, at step 1462, the control system 24 (illustrated in FIG. 1) can denoise the downsampled input images 14, 16 if the original input image 14, 16 is noisy to generate a denoised input image. Subsequently, at step 1464, the control system 24 can use a decorrelation filter on the downsampled input image or the denoised downsampled input image to reduce content correlation and to create a downsampled decorrelated input image.

Next, at step 1466, the control system 24 computes an autocorrelation matrix ("ACM") for the downsampled decorrelated input image.

Next, at step 1468, the control system rotates the ACM around it's center to a plurality of alternative angles to calculate a plurality of rotated ACM matrixes.

Next, at step 1470, the control system averages the plurality of individual rotated matrixes to calculate an averaged matrix.

Subsequently, at step 1472, the control system determines the downsampled blur kernel size from the averaged matrix.

At step 1473, the control system upscales the estimated blur size (e.g. multiples the downsampled blur kernel size by the downsample rate). In one example, if the downsampled image is approximately 50 percent of the input image, the initial blur size is multiplied by two.

Finally, at step 1474, the control system deblurs the input image utilizing the estimated blur size.

Figure 15:
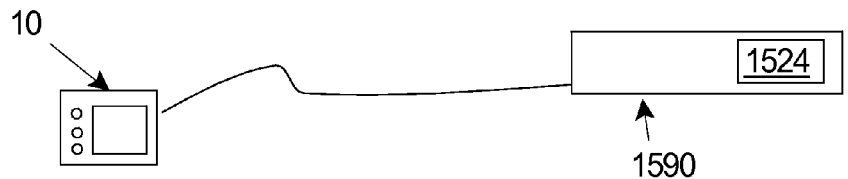
FIG. 15 illustrates another embodiment of a system having features of the present invention.

FIG. 15 illustrates another embodiment of a system that evaluates an image to determine if it is sharp or blurry. In this embodiment, the image apparatus 10 again captures an image (not shown in FIG. 15) of a scene (not shown in FIG. 15). However, in this embodiment, the image is transferred to a system 1590 (e.g. a personal computer) that includes a computer control system 1524 (illustrated as a box) that uses one or more of the methods disclosed herein to estimate if the image is blurred or sharp. Further, the computer control system 1524 can deblur the image and provide the adjusted image (not shown in FIG. 15).

It should be noted that the methods disclosed herein can be used separately or in conjunction with other blur measuring techniques to improve the accuracy of blur detection.

Additionally, in certain embodiments, EXIF information that is attached to the image file, (e.g. F number, exposure time, focus information, and/or aperture size) can be used with the methods disclosed herein to improve the performance. For example, this information can assist in further classification of the image. For example, for a micro image, the aperture size is large and the object distance is small because the image is generally pretty close. In this example, only the small portion of image is in focus and the rest can be blurred.

Further, the information regarding the aperture size and exposure time and image capture time can be used to identify if the image was captured at night. Subsequently, that information can be used to exclude pixels for saturated light situations.

Stated in another fashion, the following EXIF information can be potentially useful: Aperture size, F-number, Exposure time, ISO, Flash fired or not, EV, handholdable factor, object-distance, Tripod mode or not? Lens VR on/off, image capture time, etc. For example, the EXIF information can be combined with the methods disclosed herein in a probability framework to improve the classification performance.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for estimating whether an image is blurred or sharp, the method comprising the steps of:
    determining an image gradient histogram distribution of at least a portion of the image, wherein such determining includes the steps of dividing the image into a plurality of image regions and determining an image gradient histogram distribution of at least one of the image regions;
    comparing at least a portion of the image gradient histogram distribution to a Gaussian model, wherein such comparing includes the steps of comparing the image gradient histogram distributions for at least one of the image regions to a Gaussian model and comparing a tail section of the Gaussian model to a tail section of the image gradient histogram distribution; and
    estimating a defocus blur size of at least a portion of the image.

2. The method of claim 1 wherein the step of determining an image gradient histogram distribution of at least a portion of the image includes the step of excluding pixels having an intensity above a predetermined intensity threshold.

3. The method of claim 1 further comprising the steps of evaluating at least a portion of the image to determine if the contrast is above a predetermined contrast threshold, and adjusting the contrast for at least a portion of the image if the contrast is determined to be below the predetermined contrast threshold.

4. The method of claim 1 further comprising the step of deblurring the input image to provide an adjusted image.

5. The method of claim 1 further comprising the step of removing noise from the input image.

6. A method for estimating whether an image is blurred or sharp, the method comprising the steps of:
    determining an image gradient histogram distribution of at least a portion of the image;
    comparing at least a portion of the image gradient histogram distribution to a Gaussian model;
    estimating a defocus blur size of at least a portion of the image; and
    evaluating the image to estimate if there is a possible motion blur direction to conduct one of the following steps:
    (i) analyzing the gradient direction histogram to determine if there is a peak gradient direction; and (ii) computing reliable gradients, computing first and second principal components from the gradients, and determining if a dominant gradient direction exists.

7. The method of claim 6 wherein the step of determining includes the steps of dividing the image into a plurality of image regions and determining an image gradient histogram distribution of at least one of the image regions, and wherein the step of comparing includes the step of comparing the image gradient histogram distributions for at least one of the image regions to a Gaussian model.

8. The method of claim 6 wherein the step of comparing includes the step of comparing a tail section of the Gaussian model to a tail section of the image gradient histogram distribution for each image region.

9. The method of claim 6 further comprising the steps of evaluating at least a portion of the image to determine if the contrast is above a predetermined contrast threshold, and adjusting the contrast for at least a portion of the image if the contrast is determined to be below the predetermined contrast threshold.

10. The method of claim 6 wherein the step of determining an image gradient histogram distribution of at least a portion of the image includes the step of excluding pixels having an intensity above a predetermined intensity threshold.

11. The method of claim 6 further comprising the step of deblurring the input image to provide an adjusted image.

12. The method of claim 6 further comprising the step of removing noise from the input image.

13. A method for estimating whether an image is blurred or sharp, the method comprising the steps of:
    determining an image gradient histogram distribution of at least a portion of the image, wherein such determining includes the step of excluding pixels having an intensity above a predetermined intensity threshold;
    comparing at least a portion of the image gradient histogram distribution to a Gaussian model; and
    estimating a defocus blur size of at least a portion of the image.

14. The method of claim 13 wherein the step of determining includes the steps of dividing the image into a plurality of image regions and determining an image gradient histogram distribution of at least one of the image regions, and wherein the step of comparing includes the step of comparing the image gradient histogram distributions for at least one of the image regions to a Gaussian model.

15. The method of claim 13 wherein the step of comparing includes the step of comparing a tail section of the Gaussian model to a tail section of the image gradient histogram distribution for each image region.

16. The method of claim 13 further comprising the steps of evaluating at least a portion of the image to determine if the contrast is above a predetermined contrast threshold, and adjusting the contrast for at least a portion of the image if the contrast is determined to be below the predetermined contrast threshold.

17. The method of claim 13 further comprising the step of deblurring the input image to provide an adjusted image.

18. The method of claim 13 further comprising the step of removing noise from the input image.

19. A method for estimating whether an image is blurred or sharp, the method comprising the steps of:
    determining an image gradient histogram distribution of at least a portion of the image;
    comparing at least a portion of the image gradient histogram distribution to a Gaussian model; and
    estimating a defocus blur size of at least a portion of the image, wherein such estimating includes the steps of (i) computing an autocorrelation matrix for at least a portion of the input image, (ii) rotating the autocorrelation matrix to a plurality of alternative angles to generate a plurality of rotated matrixes, (iii) averaging the plurality of rotated matrixes to calculate an averaged matrix, and (iv) estimating the defocus blur size from the averaged matrix.

20. The method of claim 19 wherein the step of estimating a defocus blur size includes the steps of removing at least a portion of any content correlation from at least a portion of the input image to generate a decorrelated image of at least a portion of the input image; and computing an autocorrelation matrix from the decorrelated image.

21. The method of claim 20 wherein the step of removing includes the step of applying a decorrelation filter to the input image.

22. The method of claim 20 further comprising the step of rotating the autocorrelation matrix to a plurality of alternative angles to generate a plurality of rotated matrixes.

23. The method of claim 22 further comprising the steps of averaging the plurality of rotated matrixes to calculate an averaged matrix and estimating a defocus blur size from the averaged matrix.

24. The method of claim 19 further comprising the step of deblurring the input image to provide an adjusted image.

25. The method of claim 19 further comprising the step of removing noise from the input image.

26. The method of claim 19 wherein the step of determining an image gradient histogram distribution of at least a portion of the image includes the step of excluding pixels having an intensity above a predetermined intensity threshold.

27. The method of claim 19 wherein the step of determining includes the steps of dividing the image into a plurality of image regions and determining an image gradient histogram distribution of at least one of the image regions, and wherein the step of comparing includes the step of comparing the image gradient histogram distributions for at least one of the image regions to a Gaussian model.

28. The method of claim 19 wherein the step of comparing includes the step of comparing a tail section of the Gaussian model to a tail section of the image gradient histogram distribution for each image region.

29. The method of claim 19 further comprising the steps of evaluating at least a portion of the image to determine if the contrast is above a predetermined contrast threshold, and adjusting the contrast for at least a portion of the image if the contrast is determined to be below the predetermined contrast threshold.

* * * * *